US012620083B2

(12) United States Patent
Zhang et al.

(10) Patent No.: US 12,620,083 B2
(45) Date of Patent: May 5, 2026

(54) IMAGE PROCESSING METHOD, APPARATUS, AND DEVICE, AND STORAGE MEDIUM

(71) Applicant: Tencent Cloud Computing (Beijing) Co., Ltd., Beijing (CN)

(72) Inventors: Tianliang Zhang, Beijing (CN); Jinxiang Lai, Beijing (CN); Liqiang Bao, Beijing (CN); Yi Zeng, Beijing (CN); Jun Liu, Beijing (CN)

(73) Assignee: Tencent Cloud Computing (Beijing) Co., Ltd., Beijing (CN)

( * ) Notice: Subject to any disclaimer, the term of this patent is extended or adjusted under 35 U.S.C. 154(b) by 392 days.

(21) Appl. No.: 18/312,018

(22) Filed: May 4, 2023

(65) Prior Publication Data

US 2023/0274416 A1     Aug. 31, 2023

Related U.S. Application Data

(63) Continuation of application No. PCT/CN2021/107207, filed on Jul. 19, 2021.

(30) Foreign Application Priority Data

Jun. 18, 2021    (CN) .......................... 202110682879.2

(51) Int. Cl.
G06T 7/00        (2017.01)
G06T 3/4007      (2024.01)
(Continued)

(52) U.S. Cl.
CPC ............ G06T 7/001 (2013.01); G06T 3/4007 (2013.01); G06T 5/40 (2013.01); G06T 7/11 (2017.01);
(Continued)

(58) Field of Classification Search
None
See application file for complete search history.

(56) References Cited

U.S. PATENT DOCUMENTS

| | | | | |
|---|---|---|---|---|
| 2003/0228050 A1* | 12/2003 | Geshel | .................... | G06T 7/001 |
| | | | | 382/149 |
| 2021/0010953 A1 | 1/2021 | Adler et al. | | |
| 2021/0012474 A1 | 1/2021 | Huang et al. | | |

FOREIGN PATENT DOCUMENTS

| | | |
|---|---|---|
| CN | 101996908 A | 3/2011 |
| CN | 110400285 A | 11/2019 |
| | (Continued) | |

OTHER PUBLICATIONS

Asha, V., Nagappa U. Bhajantri, and P. Nagabhushan. "GLCMâbased chiâsquare histogram distance for automatic detection of defects on patterned textures." International Journal of Computational Vision and Robotics 2.4 (2011): 302-313. (Year: 2011).*
(Continued)

*Primary Examiner* — Matthew C Bella
*Assistant Examiner* — Johnny B Duong
(74) *Attorney, Agent, or Firm* — Sughrue Mion, PLLC

(57)        ABSTRACT

An image processing method, apparatus, and device, and a storage medium relate to the field of artificial intelligence. The method may include: obtaining an image corresponding to a target battery module, the target battery module including N solder joints, and the N solder joints being respectively mapped to N solder joint fields in the image; dividing the image according to the N solder joint fields to obtain N image regions in one-to-one correspondence with the N solder joint fields; calculating image difference information between each pair of adjacent image regions among the N image regions to obtain an image difference information set; and performing fault recognition on the target battery module based on the image difference information set. The accuracy for recognizing a preset fault in a battery module can be improved by the method.

20 Claims, 14 Drawing Sheets

(51) Int. Cl.

| | |
|---|---|
| *G06T 5/40* | (2006.01) |
| *G06T 7/11* | (2017.01) |
| *G06V 10/25* | (2022.01) |
| *G06V 10/74* | (2022.01) |

(52) U.S. Cl.
CPC ............ *G06V 10/25* (2022.01); *G06V 10/761* (2022.01); *G06T 2207/30152* (2013.01); *G06V 2201/07* (2022.01)

(56) References Cited

FOREIGN PATENT DOCUMENTS

| | | | | | | |
|---|---|---|---|---|---|---|
| CN | 111275679 | B | * | 1/2020 | ........... | G06T 1/0014 |
| CN | 111143589 | A | | 5/2020 | | |
| CN | 111275679 | A | | 6/2020 | | |
| CN | 111739020 | A | * | 10/2020 | ............. | G06V 10/44 |
| CN | 110400285 | B | * | 9/2021 | ......... | G06F 18/2431 |

OTHER PUBLICATIONS

Deitsch, Sergiu, et al. "Segmentation of photovoltaic module cells in uncalibrated electroluminescence images." Machine Vision and Applications 32.4 (2021): 84. (Year: 2021).*

Shina, S.G. (1991). Product Specifications and Manufacturing Process Tolerances. In: Concurrent Engineering and Design for Manufacture of Electronics Products. Springer, Boston, MA. https://doi.org/10.1007/978-1-4684-6518-1_4 (Year: 1991).*

Raihan, Fa'lq, and Win Ce. "PCB defect detection Using Opencv with image subtraction method." 2017 International Conference on Information Management and Technology (ICIMTech). IEEE, 2017. (Year: 2017).*

International Search Report for PCT/CN2021/107207 dated Mar. 15, 2022.

Written Opinion for PCT/CN2021/107207 dated Mar. 15, 2022.

* cited by examiner

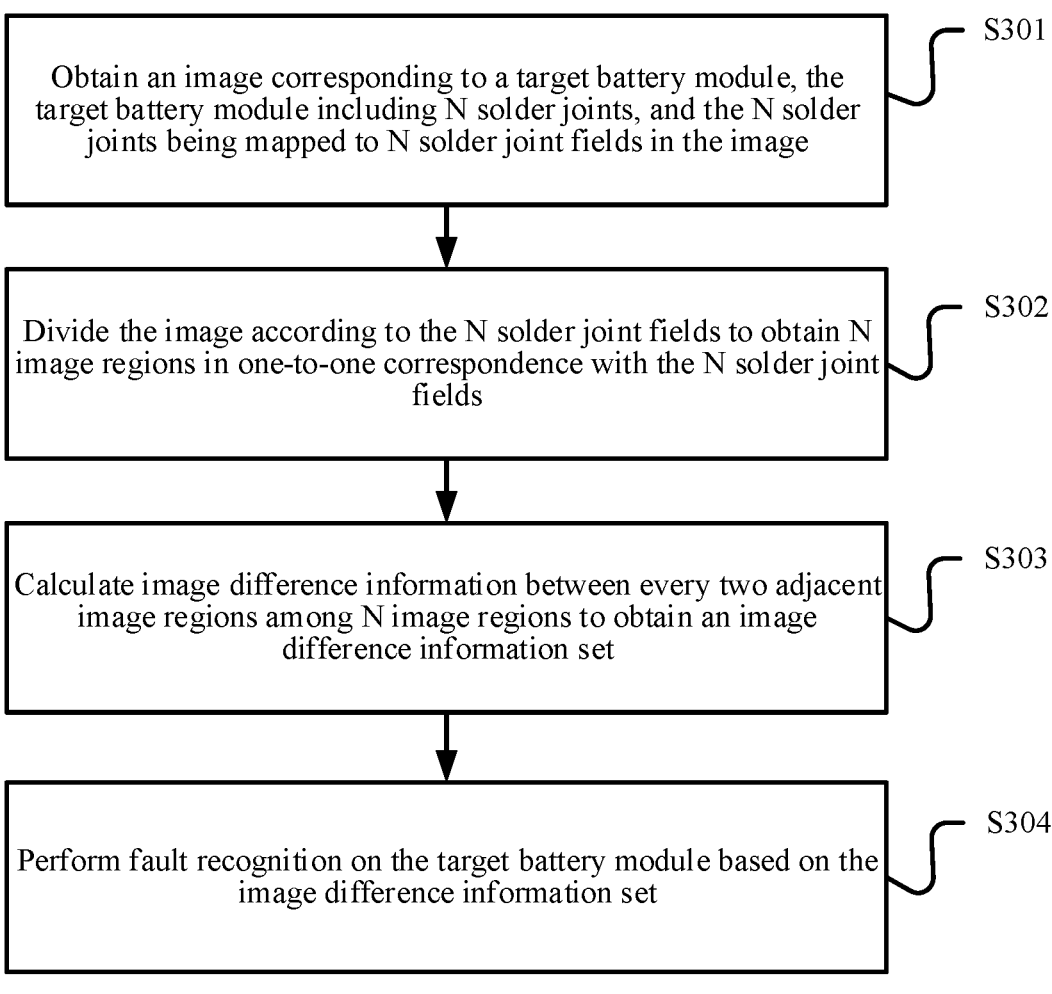

Obtain an image corresponding to a target battery module, the target battery module including N solder joints, and the N solder joints being mapped to N solder joint fields in the image

S301

Divide the image according to the N solder joint fields to obtain N image regions in one-to-one correspondence with the N solder joint fields

S302

Calculate image difference information between every two adjacent image regions among N image regions to obtain an image difference information set

S303

Perform fault recognition on the target battery module based on the image difference information set

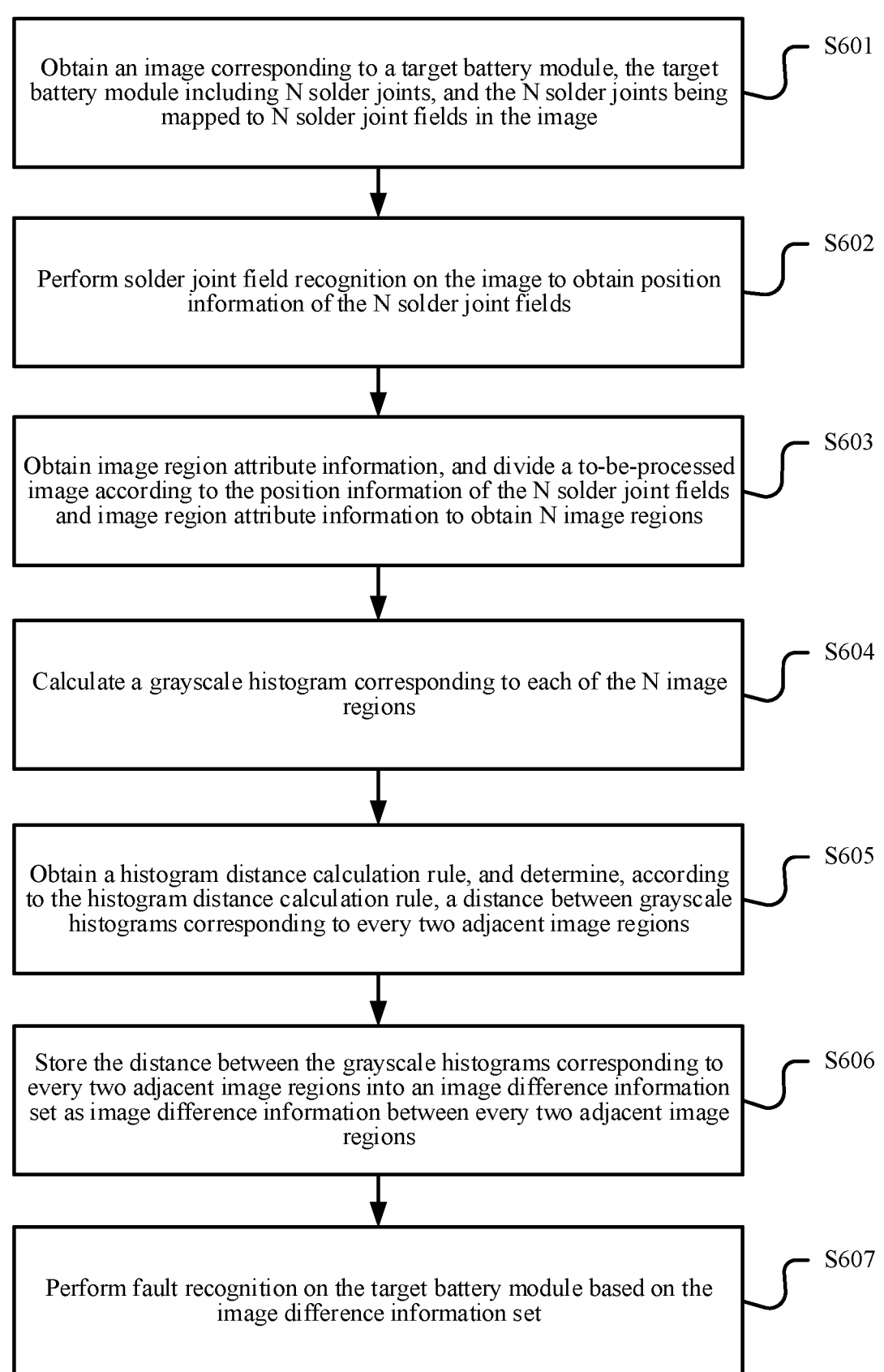

S601

Obtain an image corresponding to a target battery module, the target battery module including N solder joints, and the N solder joints being mapped to N solder joint fields in the image

S602

Perform solder joint field recognition on the image to obtain position information of the N solder joint fields

S603

Obtain image region attribute information, and divide a to-be-processed image according to the position information of the N solder joint fields and image region attribute information to obtain N image regions

S604

Calculate a grayscale histogram corresponding to each of the N image regions

S605

Obtain a histogram distance calculation rule, and determine, according to the histogram distance calculation rule, a distance between grayscale histograms corresponding to every two adjacent image regions

S606

Store the distance between the grayscale histograms corresponding to every two adjacent image regions into an image difference information set as image difference information between every two adjacent image regions

S607

Perform fault recognition on the target battery module based on the image difference information set

IMAGE PROCESSING METHOD, APPARATUS, AND DEVICE, AND STORAGE MEDIUM

CROSS-REFERENCE TO RELATED APPLICATIONS

This application is a bypass continuation application of International Patent Application No. PCT/CN2021/107207, filed on Jul. 19, 2021, which is based on and claims priority to Chinese Patent Application No. 202110682879.2, filed with the China National Intellectual Property Administration on Jun. 18, 2021, the disclosures of each of which are incorporated herein by reference in their entireties.

FIELD

This disclosure relates to the field of artificial intelligence, and in particular, to an image processing method, apparatus, and device, and a storage medium.

BACKGROUND

A solar cell is a photoelectric semiconductor sheet that uses sunlight to generate electricity.

An important battery component of a solar battery is a solar cell. In many cases, a solar battery fails due to a fault in a solar cell.

SUMMARY

Embodiments of the disclosure may provide an image processing method, apparatus, and device, and a storage medium, capable of accurate fault recognition for a target battery model.

According to an aspect of the disclosure, an image processing method performed by an image processing device may be provided, which includes: obtaining an image corresponding to a target battery module, the target battery module comprising a plurality of solder joints, the plurality of solder joints being respectively mapped to a plurality of solder joint fields in the image, wherein a number of the plurality of solder joints is equal to a number of the plurality of solder joint fields; dividing the image according to the plurality of solder joint fields to obtain a plurality of image regions in one-to-one correspondence with the plurality of solder joint fields, wherein the number of the plurality of solder joint fields is equal to a number of the plurality of image regions; calculating image difference information between each pair of adjacent image regions among the plurality of image regions to obtain an image difference information set; and performing fault recognition on the target battery module based on the image difference information set.

According to an aspect of the disclosure, an image processing apparatus may be provided, which includes: an obtaining unit, configured to obtain an image corresponding to a target battery module, the target battery module comprising a plurality of solder joints, the plurality of solder joints being respectively mapped to a plurality of solder joint fields in the image, wherein a number of the plurality of solder joints is equal to a number of the plurality of solder joint fields; a determining unit, configured to divide the image according to the plurality of solder joint fields to obtain a plurality of image regions in one-to-one correspondence with the plurality of solder joint fields, wherein the number of the plurality of solder joint fields is equal to a number of the plurality of image regions, and calculate image difference information between each pair of adjacent image regions among the plurality of image regions to obtain an image difference information set; and a recognizing unit, configured to perform fault recognition on the target battery module based on the image difference information set.

According to an aspect of the disclosure, an image processing apparatus may be provided, which includes: at least one computer storage medium storing at least one computer program; and at least one processor configured to execute the at least one computer program, the at least one computer program thereby causing the at least one processor to perform operations of an image processing method according to the foregoing aspects.

According to an aspect of the disclosure, a non-transitory computer storage medium storing a computer program may be provided, the computer program, when executed by a processor, being configured to an image processing method according to the foregoing aspects.

According to an aspect of the disclosure, a computer program product or a computer program may be provided, which includes: a computer instruction, the computer instruction being stored in a computer-readable storage medium, a processor of an image processing device reading the computer instruction from the computer-readable storage medium, and the processor executing the computer instruction, so that the image processing device performs an image processing method according to the foregoing aspects.

Technical solutions provided in embodiments of the disclosure achieves at least the following beneficial effects:

To perform fault recognition on a target battery module, an image corresponding to the target battery module is to be obtained. The image includes images of N solder joints on the target battery module. The image is divided into image regions corresponding to solder joint fields where solder joints are located. Since there may be abnormal image difference information between image regions where at least two solder joint fields are located in an image corresponding to a faulty battery module, a faulty solder joint on the target battery module may be accurately determined by comparing the image difference information between adjacent image regions on a same image. For a batch of target battery modules, fault recognition is performed on respective images of the target battery modules, and the fault recognition on the respective target battery modules does not interfere with each other, such that even if a gray level difference between images of different target battery modules is large, accurate fault recognition on each target battery module can be realized.

BRIEF DESCRIPTION OF THE DRAWINGS

To describe the technical solutions of example embodiments of the disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

FIG. 4 is a schematic flowchart of an image processing method according to an embodiment of the disclosure;

FIG. 10 is a schematic flowchart of another image processing method according to an embodiment of the disclosure;

FIG. 13 is a schematic diagram of image difference information according to an embodiment of the disclosure;

DETAILED DESCRIPTION OF THE EMBODIMENTS

Figure 1:
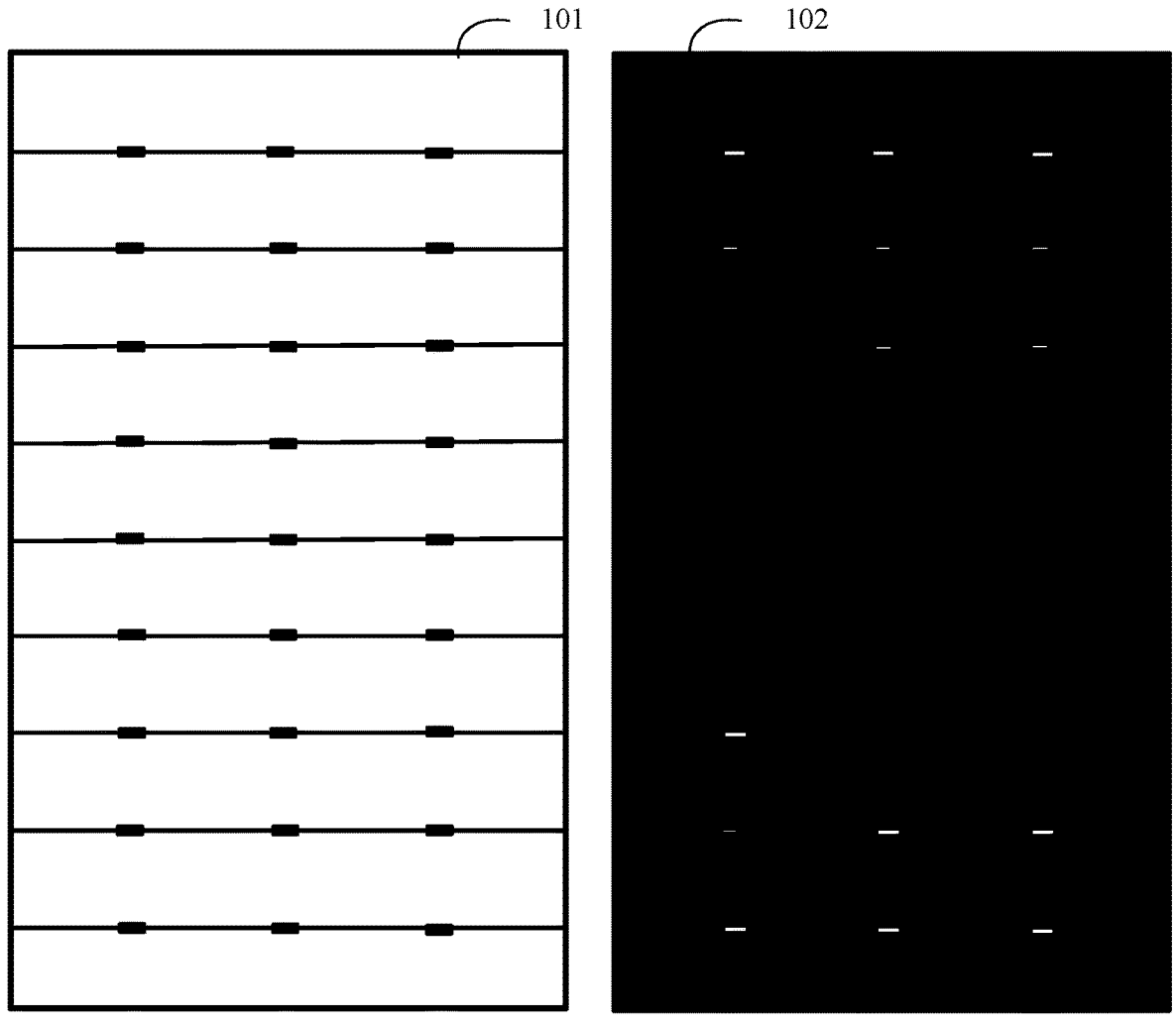
FIG. 1 is a schematic diagram of fault recognition through gray-level thresholding according to an embodiment of the disclosure.

Currently, in the development of new energy photovoltaic industry, fault detection for solar batteries is desired. In general, potential faults in photovoltaic solar battery products are usually detected by electroluminescence (EL), thereby controlling product quality. Fault detection through EL is essentially to obtain EL images reflecting internal information of solar batteries through EL, and then recognize possible faults in solar batteries by analyzing and processing the EL images. Generally speaking, the most common fault in a solar battery is pseudo soldering in a plurality of solder joints of a battery module (such as a solar cell) in the solar battery. Therefore, embodiments of the disclosure mainly focus on studying whether a pseudo soldering fault exists in a battery module in a solar battery. It is to be understood that during pseudo soldering fault detection for a battery module, an EL image includes N solder joint fields, and the N solder joint fields are in one-to-one correspondence with N solder joints on the battery module, which, in other words, may be understood as that each solder joint is mapped to one solder joint field in EL image, or as that the solder joints on the battery module are mapped into the EL image to obtain solder joint fields. For example, each solder joint field may be a pixel point or a small region composed of a plurality of pixel points. In fault detection, it is preferable to recognize N image regions in an image, and one image region is centered on one solder joint field, which may be understood as that one image region corresponding to one solder joint. "A plurality of" in the disclosure refers to two or more than two, and may also be expressed as "at least two".

In the study of pseudo soldering fault detection for a battery module, the following pseudo soldering fault recognition methods are proposed.

The first method is manual detection. In an EL image, gray levels between an image region corresponding to a solder joint with a pseudo soldering fault and an image region corresponding to a solder joint without a pseudo soldering fault are different, either too high or too low. An image region corresponding to each solder joint refers to an image region in an EL image including a solder joint field corresponding to the solder joint. In other words, in the EL image, an image region corresponding to a solder joint includes a solder joint field corresponding to the solder joint. On this basis, pseudo soldering fault detection may be performed according to gray levels in the EL image through manual observation. For example, in a case that an overall gray level of an EL image is low, a solder joint corresponding to an image region having a high gray level may be determined as a solder joint having a pseudo soldering fault. For another example, in a case that an overall gray level of the EL image is high, a solder joint corresponding to an image region having a low gray level may be determined as a solder joint having a pseudo soldering fault.

The second method is thresholding. As an example, a gray level threshold is preset, and gray-level thresholding is performed on an EL image. In the EL image undergone gray-level thresholding, image regions having gray levels greater or less than the gray level threshold are highlighted, and solder joints corresponding to these image regions are determined as solder joints having pseudo soldering faults. For example, assuming that a battery module refers to a solar cell, referring to FIG. 1, which is a schematic diagram of gray-level thresholding according to an embodiment of the disclosure, an image 101 represents an EL image corresponding to the solar cell, and an image 102 represents an EL image undergone gray-level thresholding.

The third method is artificial intelligence-based image processing, in which pseudo soldering fault recognition is mainly carried out based on image difference information between image regions corresponding to every two adjacent solder joints. Artificial intelligence (AI) is a theory, method, technology, and an application system that uses a digital computer or a machine controlled by the digital computer to simulate, extend, and expand human intelligence, perceive an environment, obtain knowledge, and use knowledge to obtain an optimal result. In other words, artificial intelligence is a comprehensive technology in computer science, attempting to understand the essence of intelligence to produce a new intelligent machine that may react in a manner similar to human intelligence. Artificial intelligence involves the study of design principles and implementation methods of various intelligent machines, to enable the machines to have the functions of perception, reasoning, and decision-making.

Artificial intelligence technology is a comprehensive subject, relating to a wide range of fields and both hardware and software technologies. Basic artificial intelligence technologies generally include technologies such as a sensor, a dedicated artificial intelligence chip, cloud computing, distributed storage, a big data processing technology, an operation/interaction system, and electromechanical integration.

An artificial intelligence software technology mainly includes fields such as computer vision technology, speech processing technology, natural language processing technology, and machine learning/deep learning, autonomous driving, and intelligent transportation.

Computer vision (CV) is a science that studies how to use a machine to "see", and particularly, refers to machine vision that uses cameras and computers instead of human eyes to recognize, track, and measure targets, and performs graphic processing by computers into images more suitable for observation by human eyes or transmission to an instrument for detection. As a scientific subject, computer vision studies related theories and technologies, attempting to establish an artificial intelligence system capable of obtaining information from images or multidimensional data. Computer vision technology generally includes technologies such as image processing, image recognition, image semantic understanding, image retrieval, optical character recognition (OCR), video processing, video semantic understanding, video content/behavior recognition, three-dimensional (3D) object reconstruction, 3D technology, virtual reality, augmented reality, simultaneous localization and mapping, autonomous driving, intelligent transportation, and further includes biological feature recognition technologies such as common face recognition and fingerprint recognition.

Image processing provided in the disclosure mainly relates to image processing technologies in artificial intelligence. As an example, an image corresponding to a target battery module is obtained (the image may be the foregoing EL image), then the image is divided based on N solder joint fields corresponding to N solder joints in the image to obtain N image regions in one-to-one correspondence with the N solder joint fields or N image regions in one-to-one correspondence with the N solder joints, where each image region includes a solder joint field, and one image region and the solder joint field included in the image region have a same or substantially same center. Further, image difference information between every two adjacent image regions among the N image regions is determined, and finally, pseudo soldering fault recognition is performed on the battery module based on the image difference information. For example, in a case that there is a target quantity of target image difference information, it may be determined that the target battery module has a pseudo soldering fault. For another example, a solder joint having a pseudo soldering fault in the battery module is determined based on mean gray values of two adjacent image regions related to the target image difference information, where the target image difference information is image difference information satisfying a fault existence condition.

Upon comparison and analysis of the three methods described above, the first method has problems of high detection cost (mainly due to the need of selecting quality inspectors from employees) in respect of enterprises, and in respect of quality inspectors, a high difficulty in detection because a gray level difference of image regions in the EL image of one single battery module is small, which may lead to a high employee turnover rate due to high work intensity and monotonous work content. In addition, because mastery levels of quality inspectors over assessment criteria are different, product quality cannot be guaranteed due to inconsistencies in assessment criteria. In addition, after a long-time quality inspection on a large quantity of images, quality inspectors are prone to visual fatigue, which may result in misjudgment or missed judgment, leading to a low fault detection accuracy.

Figure 2:
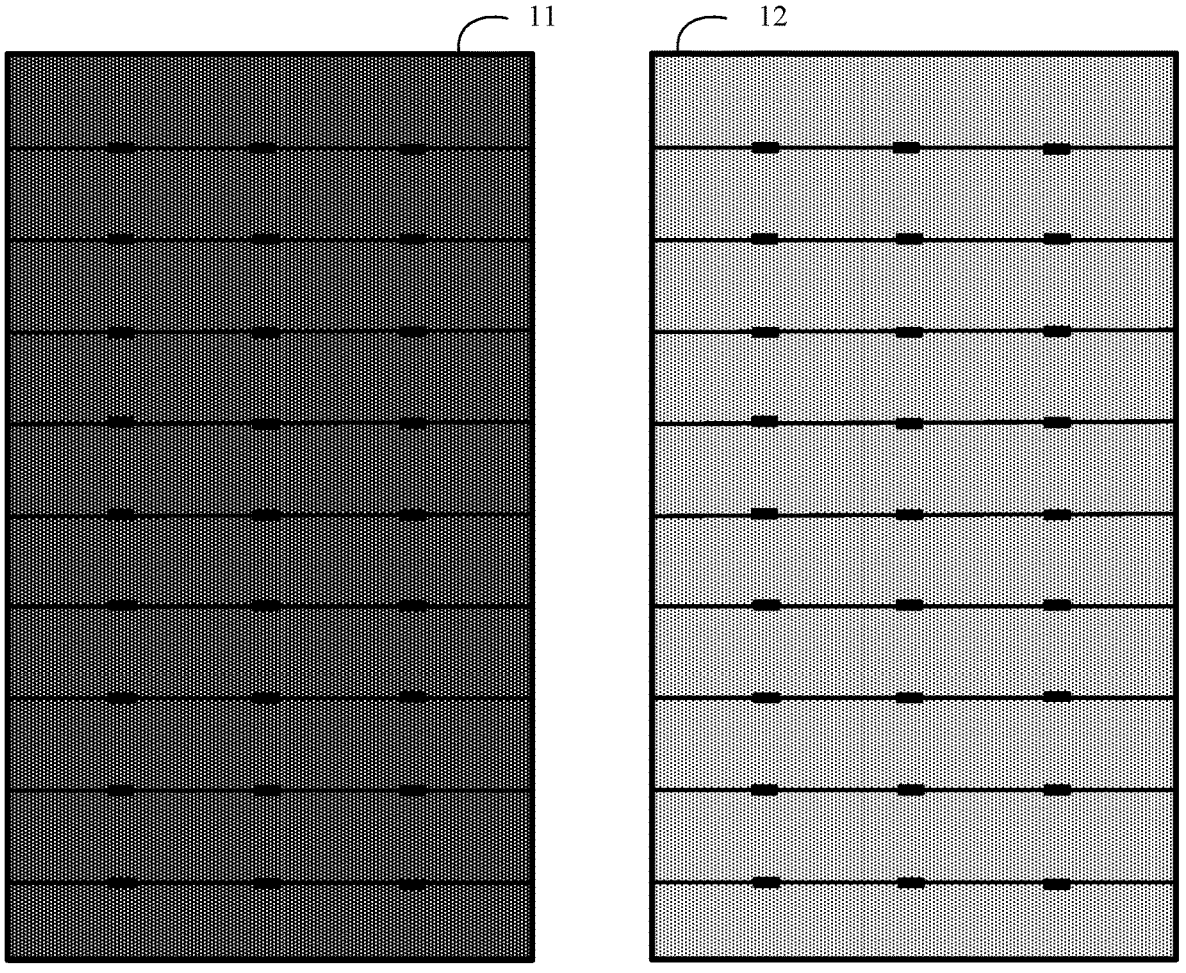
FIG. 2 is a schematic diagram of electroluminescence (EL) images corresponding to different solar cells according to an embodiment of the disclosure.

In the second method, determination is performed based only on different gray levels of image regions, and image regions are not compared with adjacent image regions in gray levels, which leads to a serious overkill problem (overkill means determining a battery module having no pseudo soldering fault as having a pseudo soldering fault). In addition, since overall gray levels of EL images of different battery modules are quite different, it is difficult to set a gray level threshold. For example, a battery module is a solar cell. An image 11 and an image 12 in FIG. 2 are EL images of two different solar cells, and gray levels of the image 11 and the image 12 are different. The image 11 is relatively darker and the image 12 is relatively brighter. In FIG. 2, different gray levels are indicated through dot filling. Dot filling with a darker color indicates a higher gray level, and dot filling with a lighter color indicates a lower gray level.

In view of the above, there may be abnormal image difference information between two or more image regions in the EL image corresponding to the battery module having a pseudo soldering fault. According to the third method, whether a battery module has a pseudo soldering fault may be accurately determined through image difference information. Therefore, the following description of embodiments of the disclosure focuses on the third method.

Figure 3:
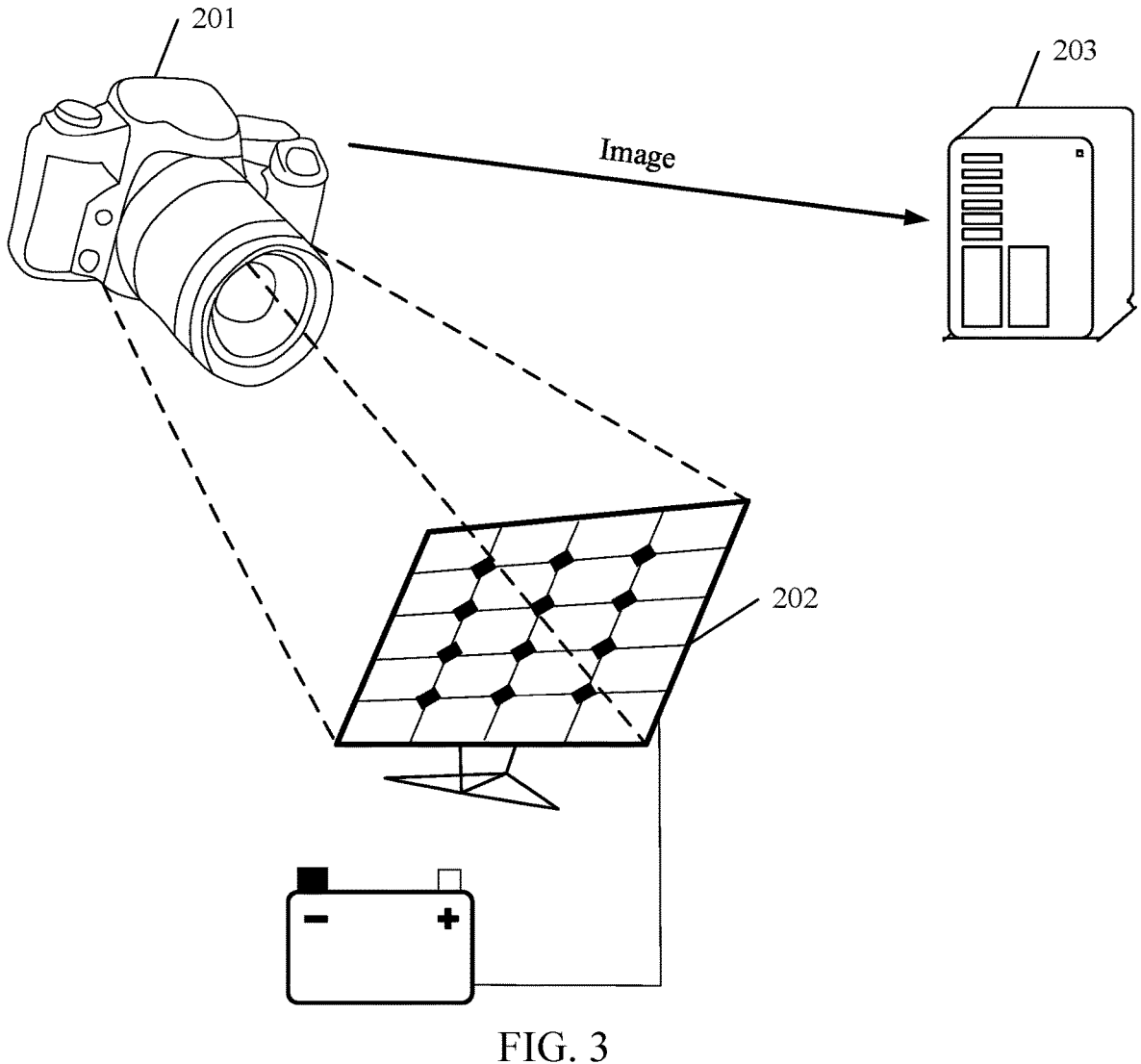
FIG. 3 is a schematic structural diagram of a fault detection system for a battery module according to an embodiment of the disclosure.

Based on the foregoing image processing method, an embodiment of the disclosure provides a fault detection system for a battery module. FIG. 3 shows a structural schematic diagram of the fault detection system. In FIG. 3, assuming that a to-be-inspected battery module is a target solar cell, the target solar cell is any one of solar cells constituting a solar battery. The fault detection system shown in FIG. 3 may include a camera device 201, a target solar cell 202, and an image processing device 203. The camera device 201 may be communicably connected to the image processing device 203. The camera device 201 may be a charge coupled device (CCD), which may be simply referred to as a CCD camera, or another device that may collect photons. The image processing device 203 may be a terminal such as smartphone, tablet, laptop, desktop computer, smart speaker, smart watch, smart on-board device; or a server such as an independent server, or a server cluster or a distributed system formed by a plurality of physical servers, or a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

In a case that pseudo soldering fault detection is to be performed on a target solar cell, a forward bias voltage is applied to the target solar cell in a darkroom. In this case, due to an interband radiation recombination, photons having a near infrared wavelength are emitted from an interior of the target solar cell, and the camera device 201 collects these photons to obtain an image related to the target solar cell, which may be used to reflect some information of the target solar cell. Assuming that the target solar cell includes N solder joints, during the photography by the camera device 201, each solder joint is mapped to a solder joint field in the image, so that the image may include N solder joint fields in one-to-one correspondence with the N solder joints. As an example, the solder joints here may have a certain area, not just a spot. Therefore, the solder joints mapping into the image occupies a certain value field and is accordingly named as solder joint fields.

Further, the camera device 201 transmits the image to the image processing device 203. The image processing device 203 divides the image based on the N solder joint fields to determine N image regions in one-to-one correspondence with the N solder joint fields, where each image region includes one solder joint field, and one image region has a same or substantially same center as the solder joint field included therein, and then determines image difference information between every two adjacent image regions among the N image regions and stores the image difference information in an image difference information set. Next, the image processing device 203 performs pseudo soldering fault recognition on the target solar cell based on the image difference information set. Since there may be abnormal image difference information between two or more image regions in an image corresponding to a solar cell having a pseudo soldering fault, the image processing device 203 may more accurately recognize whether the target solar cell has a pseudo soldering fault through the image difference information set. N is a positive integer greater than or equal to 1.

FIG. 4 is a flowchart of an image processing method according to an embodiment of the disclosure. The method may be applied to an image processing device in the foregoing fault detection system. As an example, the method may be performed by a processor of the image processing device. Operations of the method are as follows:

Operation S301: Obtain an image corresponding to a target battery module, the target battery module including N solder joints, and the N solder joints being mapped to N solder joint fields in the image.

The image may be obtained from a camera device. As an example, the target battery module is placed under forward bias, and after radiation recombination, a minority of carriers injected into the target battery module emit photons, which are collected by the camera device, for example, by using a CCD camera, to obtain a spatial resolution image of a radiation recombination distribution of the target battery module. The spatial resolution image is an image used for fault recognition on the target battery module, and the image processing device obtains the image from the camera device.

Figure 5:
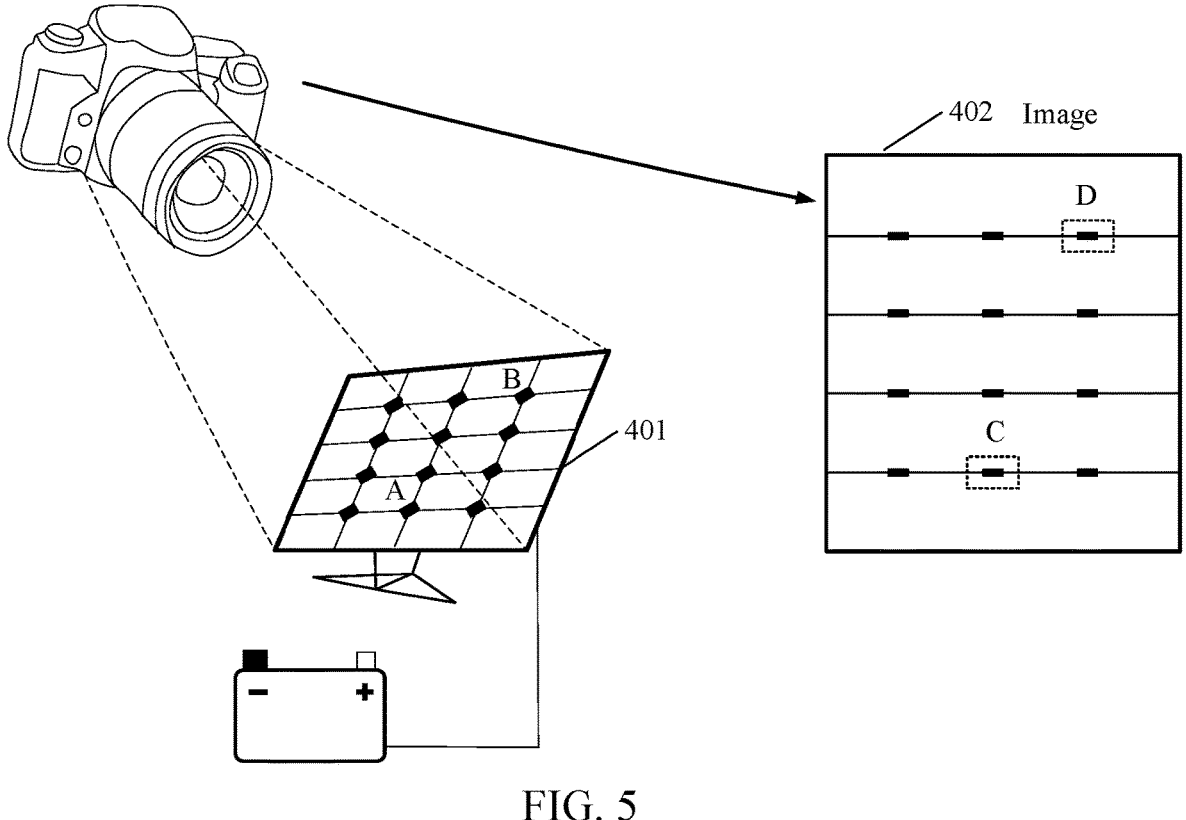
FIG. 5 is a schematic diagram of a to-be-detected image according to an embodiment of the disclosure.

The target battery module may include N solder joints, where N is an integer greater than or equal to 1; that is, a positive integer. The image includes N solder joint fields in one-to-one correspondence with the N solder joints. As an example, a solder joint field is a representation of a solder joint in the image, and the solder joint field may be composed of one pixel point, or may be composed of a set of at least two pixel points. As an example, the shape and size of each solder joints may be substantially the same, and correspondingly, the shape and size of the N solder joint fields on the image may be substantially the same; or the shape and size of the solder joints may be different, and correspondingly, the shape and size of the N solder joint fields on the image may also be different. Assuming that a solder joint field may be a rectangle, a target battery module is a target solar cell. For example, referring to FIG. 5, which is a schematic diagram of a to-be-detected image according to an embodiment of the disclosure, an image 402 is obtained by photographing a target solar cell 401 by a camera device. A and B in solar cell 401 are two solder joints, and C and D in the image 402 are two solder joint fields. The solder joint field C corresponds to the solder joint A, and the solder joint field D corresponds to the solder joint B.

Operation S302: Divide the image according to the N solder joint fields to obtain N image regions in one-to-one correspondence with the N solder joint fields.

In view of the above, in the image processing method shown in FIG. 4, fault recognition is performed on the target battery module mainly according to the image difference information between every two adjacent image regions, where every two adjacent image regions are image regions corresponding to every two adjacent solder joints. One image region described above includes a solder joint field, and the image region and the solder joint field included in the image region have a substantially same center. Therefore, the image region including the solder joint field is an image region corresponding to the solder joint corresponding to the solder joint field. Before calculating the image difference information between every two adjacent image regions, the image region where each solder joint field is located in the image may be determined by operation S302. If the size and shape of the solder joints are substantially identical, the size and shape of the solder joint fields corresponding to the solder joints in the image may also be substantially identical, and by extension, the size of the image regions where solder joint fields are located in embodiments of the disclosure may also be substantially identical.

In one embodiment, in response to determining image regions where solder joint fields are located, an image processing device may first recognize N solder joint fields from the image and then divide the image based on the N solder joint fields and preset image region attribute information (the shape and size of an image region) to obtain N image regions in one-to-one correspondence with the N solder joint fields. For example, the dividing of the image may include: performing solder joint field recognition on the image to obtain position information of the N solder joint fields; obtaining image region attribute information, where the image region attribute information is used for indicating the shape and size of an image region; and dividing the image based on the position information of the N solder joint fields and the image region attribute information to obtain N image regions.

A solder joint field is represented by a solder joint field center and solder joint field attribute information, and the solder joint field attribute information includes the shape and size of the solder joint field. Therefore, to obtain the position information of N solder joint fields, central positions of the N solder joint fields may be obtained first, where the central position of a solder joint field may be a pixel point, and then a solder joint field may be determined based on solder joint field attribute information and the central position. For example, if the solder joint field attribute information indicates that the solder joint field is a rectangle with a length x and a width y, assuming a central position is expressed as $(x_1, y_1)$, then the position information of the solder joint field is determined according to the solder joint field attribute information and the central position, and the position information of the solder joint field is represented by four position coordinates, which are $(x_1+x/2, y_1-y/2)$, $(x_1+x/2, y_1+y/2)$, $(x_1-x/2, y_1-y/2)$, and $(x_1-x/2, y_1+y/2)$, respectively.

In an image, a central position may be represented by a width value and a height value, that is, a width value and a height value represent a solder joint field. Therefore, in the embodiment of the disclosure, performing pixel point recognition on the image to obtain central positions of N solder joint fields may be understood as: performing recognition processing on the image to obtain at least two width values and at least two height values, and combining the at least two width values and the at least two height values in pairs to obtain the central positions of the N solder joint fields. For example, performing solder joint field recognition may include the following operations:

S1: performing grayscale accumulation on the image in a vertical direction based on an integral projection algorithm to obtain a horizontal integral projection, and performing grayscale accumulation on the image in a horizontal direction based on the integral projection algorithm to obtain a vertical integral projection, where a width of the horizontal integral projection represents a width of the image, a height of the horizontal integral projection represents a result of grayscale accumulation in respect of at least two length values corresponding to each width value, a width of the vertical integral projection represents a height of the image, and a height of the vertical integral projection represents a result of grayscale accumulation in respect of at least two width values corresponding to each height value.

The grayscale accumulation performed on the image in the vertical direction based on the integral projection algorithm may be represented by formula (1):

$$G_W = \sum_{y=1}^{H} G(x, y), x \in (1, W); \tag{1}$$

Figure 6:
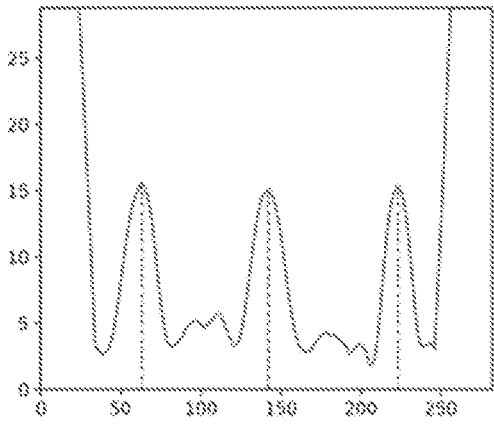
FIG. 6 is a schematic diagram of a horizontal integral projection according to an embodiment of the disclosure.

In formula (1), W represents the width of the image, and H represents the height of the image. A horizontal integral projection is obtained by performing the grayscale accumulation in the vertical direction according to formula (1), as shown in FIG. 6, in which the abscissa direction represents the width of the image, and the ordinate direction represents the result of the grayscale accumulation performed on at least two pixels in respect of at least two length values corresponding to each width value.

The grayscale accumulation performed on the image in the horizontal direction based on the integral projection algorithm may be represented by formula (2):

$$G_H = \sum_{x=1}^{W} G(x, y), y \in (1, H); \tag{2}$$

Figure 7:
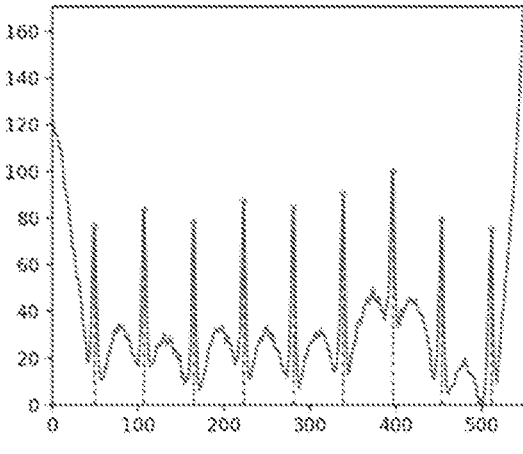
FIG. 7 is a schematic diagram of a vertical integral projection according to an embodiment of the disclosure.

A vertical projection is obtained after the grayscale accumulation is performed in the horizontal direction according to formula (2), as shown in FIG. 7, in which the abscissa direction represents the height of the image, and the ordinate direction represents the result of the grayscale accumulation on at least two pixels in respect of at least two width values corresponding to each height value.

Figure 8:
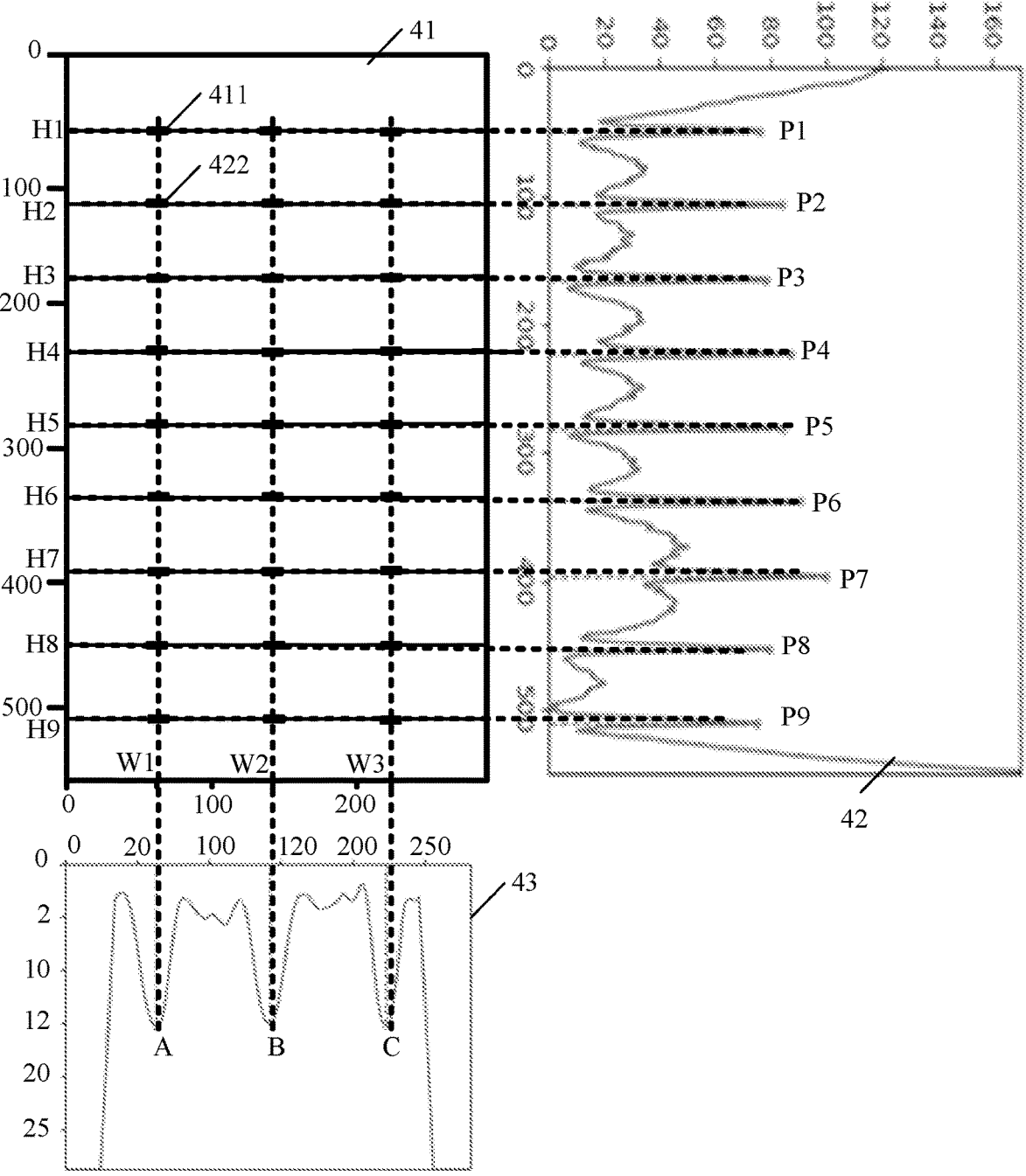
FIG. 8 is a schematic diagram of relationships between an image, a horizontal integral projection, and a vertical integral projection according to an embodiment of the disclosure.

FIG. 8 illustrates an example of the relationships between a horizontal integral projection 43, a vertical integral projection 42, and an image 41, according to an embodiment. It can be seen from FIG. 8 that the abscissa direction of the vertical integral projection 42 is equal to the height of the image, and the abscissa direction of the horizontal integral projection 43 is equal to the width of the image.

S2: Obtain M width values corresponding to M peaks in the horizontal integral projection.

The image processing device obtains M peaks in the horizontal integral projection, and obtains M width values corresponding to the M peaks in the image based on the width values of the M peaks in the horizontal integral projection. Because the width in the horizontal integral projection represents the width of the image, the M width values of the M peaks in the horizontal integral projection are the M width values in the image.

In the embodiment of the disclosure, the peaks in the horizontal integral projection are maximum values of changing grayscale accumulation within a width range considered. In the horizontal integral projection shown in FIG. 8, A, B, and C represents peaks. The width value corresponding to peak A is W1, the width value corresponding to peak B is W2, and the width value corresponding to peak C is W3.

S3: Obtain P height values corresponding to P peaks in the vertical integral projection.

The image processing device obtains P peaks in the vertical integral projection, and obtains, based on the height values of the P peaks in the vertical integral projection, P height values corresponding to the P peaks in the image. Because the width in the vertical integral projection represents the height of the image, the P height values of the P peaks in the vertical integral projection are the P height values in the image.

In the embodiment of the disclosure, the peaks in the vertical integral projection are maximum values of the changing grayscale accumulation within a height range considered. In the vertical integral projection shown in FIG. 8, P1-P9 represents peaks. The height value corresponding to the peak P1 is H1, the height value corresponding to the peak P2 is H2, and so on, and the height value corresponding to the peak P9 is H9.

Operations S2 and S3 may be performed in parallel.

S4: Perform permutation and combination on the M width values and P height values to obtain N central positions corresponding to N solder joint fields.

The image processing device performs permutation and combination on the M width values and P height values to obtain N position information, where each piece of the position information corresponds to a central position of a solder joint field.

M and P are both positive integers, and the product of M and P is N. As an example, performing permutation and combination on the M width values and P height values may be understood as combining each width value with P height values, respectively. For example, M width values are W1, W2 and W3, and P height values are H1, H2, . . . , H9, permutation and combination is performed on the M width values and P width values to obtain position information represent as: (W1, P1), (W1, P2), (W1, P3), . . . , (W1, P9), (W2, P1), (W2, P2), . . . , (W2, P9), (W3, P1), (W3, P2), . . . , (W3, P9).

For example, assuming the relationships among the image, the horizontal integral projection, and the vertical integral projection are as shown in FIG. 8, in which the horizontal integral projection includes three peaks A, B and C, and the width values corresponding to the three peaks are W1, W2 and W3, respectively; the vertical integral projection includes 9 peaks P1-P9, and the corresponding height values are H1-H9, respectively. Firstly, the image processing device combines W1 and H1 to obtain a central position 411 of a solder joint field, and then combines W1 and H2 to obtain another central position 422 of a solder joint field, and so on, so that N central positions of the solder joint fields on the image can be obtained.

S5: Determine position information of the N solder joint fields based on the N central positions and solder joint field attribute information, where the solder joint field attribute information is used for indicating the shape and size of a solder joint field.

After the central position information of the N solder joint fields on the image is determined by the foregoing operations S1-S4, solder joint field attribute information is further obtained. The solder joint field attribute information includes the shape and size of a solder joint field. The solder joint field attribute information may be set based on the size and shape of a solder joint, and is used for indicating the shape and size of a solder joint field. The position information of the N solder joint fields is determined based on N central positions and the solder joint field attribute information.

After the position information of the N solder joint fields is obtained, image region attribute information is further obtained. The image region attribute information may be preset, and may include shape information and size information of each image region. For example, the image regions attribute information includes that the image regions are all rectangle, and the size information of the image regions are substantially the same, where the length is X, and the width is Y. Then, the image processing device divides the image according to the position information of the N solder joint fields and the image region attribute information. For example, if the image processing device uses the center of each solder joint field as a center, and uses a rectangle having a length equal to X and a width equal to Y as an image region, each image region includes a solder joint field.

Figure 9:
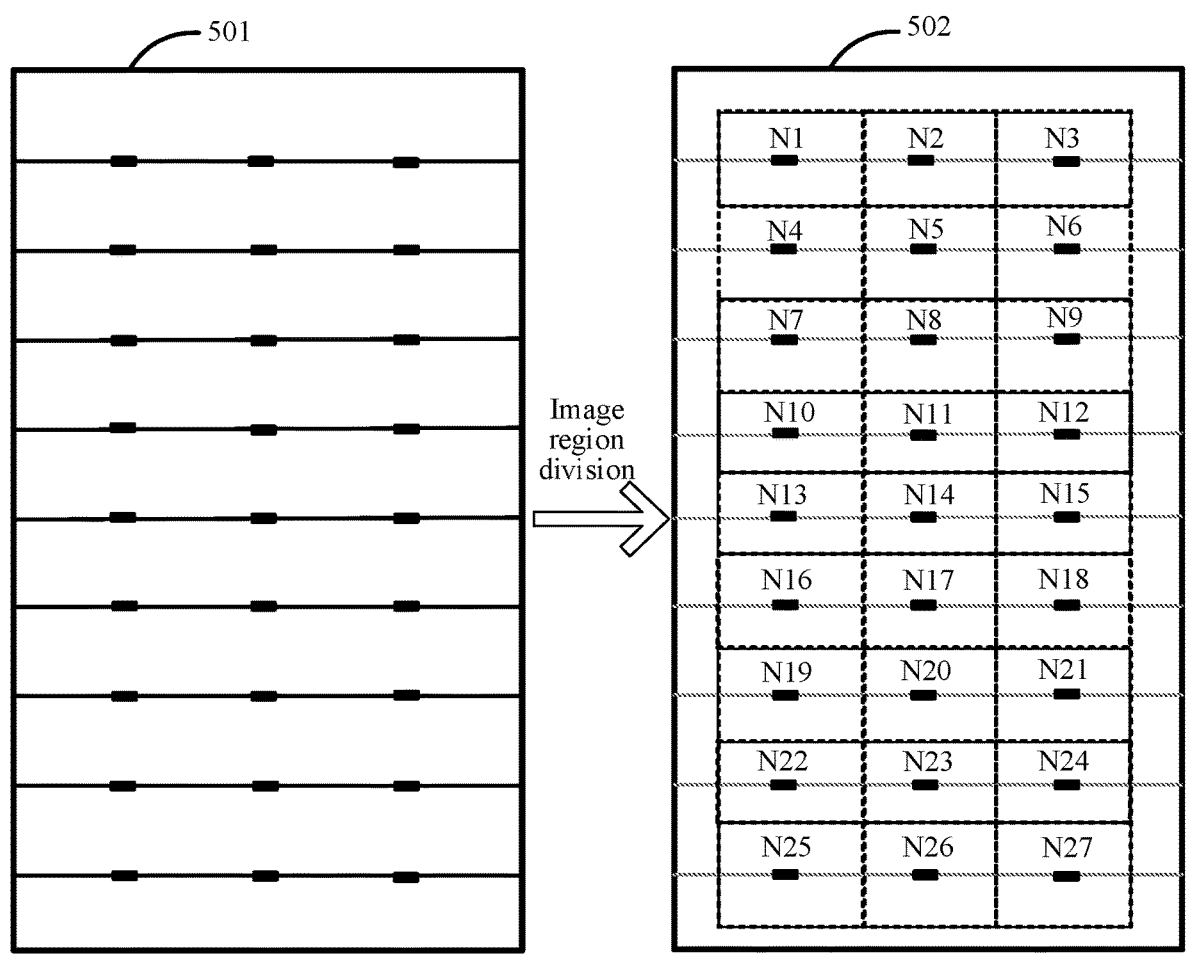
FIG. 9 is a schematic diagram of image region division according to an embodiment of the disclosure.

For example, FIG. 9 is a schematic diagram of image region division according to an embodiment of the disclosure, in which 501 represents an image before region division, and 502 represents an image after region division. In view of the above, the image divided includes N rectangles with substantially the same size and substantially the same shape. One rectangle is an image region, each rectangle and a solder joint field have a substantially same center, and an image region may also be referred to as a Region of Interest (ROI).

Operation S303: Calculate image difference information between every two adjacent image regions among the N image regions to obtain an image difference information set.

After the image is divided into N image regions, further, the image processing device determines the image difference information set according to the N image regions, where the image difference information set includes image difference information between every two adjacent image regions among the N image regions. For example, in FIG. 9, the N image regions are represented as N1, N2, N3, . . . , and N27, and the image difference information set includes image difference information between N1 and N2, image difference information between N1 and N4, image difference information between N2 and N3, image difference information between N2 and N5, etc. Such may also be termed pairs of adjacent image regions, each pair including two image regions. It is noted that each individual image region may be included in more than one pair of adjacent image regions.

As an example, the image processing device determining the image difference information set according to the N image regions includes: calculating image difference information between every two adjacent image regions, and storing the calculated image difference information into the image difference information set.

As an optional implementation, the image difference information between two adjacent image regions may be a distance between grayscale histograms corresponding to the two adjacent image regions. Therefore, the image processing device calculating image difference information between two adjacent image regions may include: respectively obtaining grayscale histograms corresponding to two adjacent image regions, calculating a distance between the two grayscale histograms, and using the distance as image difference information between the two adjacent image regions.

As another optional implementation, the image difference information between two adjacent image regions may be a difference in mean gray values of two adjacent image regions. Therefore, the image processing device calculating image difference information between two adjacent image regions may include: calculating a difference in mean gray values between two adjacent image regions. The mean gray value of each image region is a mean gray value of at least two pixels in the image region.

Operation S304: Perform fault recognition on the target battery module based on the image difference information set.

In one embodiment, the image processing device performing fault recognition on the target battery module based on the image difference information set may include: determining, in response to a target quantity of target image difference information existing in the image difference information set, that the target solar cell module has a preset fault, where the target image difference information is image difference information that satisfies a fault existence condition. The preset fault here may be a pseudo soldering fault, and in a case that the image difference information is a distance between grayscale histograms corresponding to two adjacent image regions, the fault existence condition includes that the distance between grayscale histograms corresponding to two adjacent image regions is greater than or equal to a distance threshold. For example, the distance threshold may be preset in the image processing device. The target quantity may be a value preset by the image processing device, such as 1 or 2. In a case that the image difference information refers to a difference in mean gray values between two adjacent image regions, the fault existence condition includes that the difference in mean gray values between two adjacent image regions is greater than or equal to a mean gray value threshold. For example, the mean gray value threshold may be preset in the image processing device.

In conclusion, in the image processing method provided by the embodiment, to perform fault recognition on a target battery module, an image corresponding to the target battery module is to be obtained. The image includes images of N solder joints on the target battery module. The image is divided into image regions corresponding to solder joint fields where solder joints are located. Since there may be abnormal image difference information between image regions where at least two solder joint fields are located in an image corresponding to a faulty battery module, a faulty solder joint on the target battery module may be accurately determined by comparing the image difference information between adjacent image regions on a same image. For a batch of target battery modules, preset fault recognition is performed on respective images of the target battery modules, and the fault recognition on the respective target battery modules does not interfere with each other, such that even if a gray level difference between images of different target battery modules is large, accurate fault recognition on each target battery module can be realized.

FIG. 10 is a schematic flowchart of another image processing method according to an embodiment of the disclosure. The image processing method shown in FIG. 10 may be performed by an image processing device, and for example, by a processor of the image processing device, and includes the following operations.

Operation S601: Obtain an image corresponding to a target battery module, the target battery module including N solder joints, and the N solder joints being mapped to N solder joint fields in the image.

Operation S602: Perform solder joint field recognition on the image to obtain position information of the N solder joint fields.

In one embodiment, for implementations included in operation S601 and operation S602, reference may be made to the introduction of corresponding content in operation S301 and operation S302 in the embodiment of FIG. 4. Details are not repeated here.

Operation S603: Obtain image region attribute information, and divide the image according to the position information of the N solder joint fields and image region attribute information to obtain N image regions.

To magnify a local gray level difference of the target battery module, before being divided into regions, the image is preprocessed first to turn the image into an enhanced image, and then region division is performed on the enhanced image.

Preprocessing the image may include adaptive histogram equalization. As an example, the image processing device preprocessing the image may include: dividing the image into at least two image blocks; performing histogram equalization on each of the at least two image blocks to obtain at least two intermediate images corresponding to the at least two image blocks; and then performing bilinear interpolation on the at least two intermediate images to obtain the enhanced image. Further, the image processing device divides the enhanced image according to the position information of the N solder joint fields and the image region attribute information to obtain the N image regions.

It is to be understood that, during histogram equalization of each image block, if noise exists in the image block, the noise may be amplified, and to avoid this situation, a contrast limitation is adopted during histogram equalization of each image block. If an image block of a histogram exceeds the contrast limitation, pixels in the image block are cropped and evenly distributed to other image blocks before performing histogram equalization on the image block.

Figure 11:
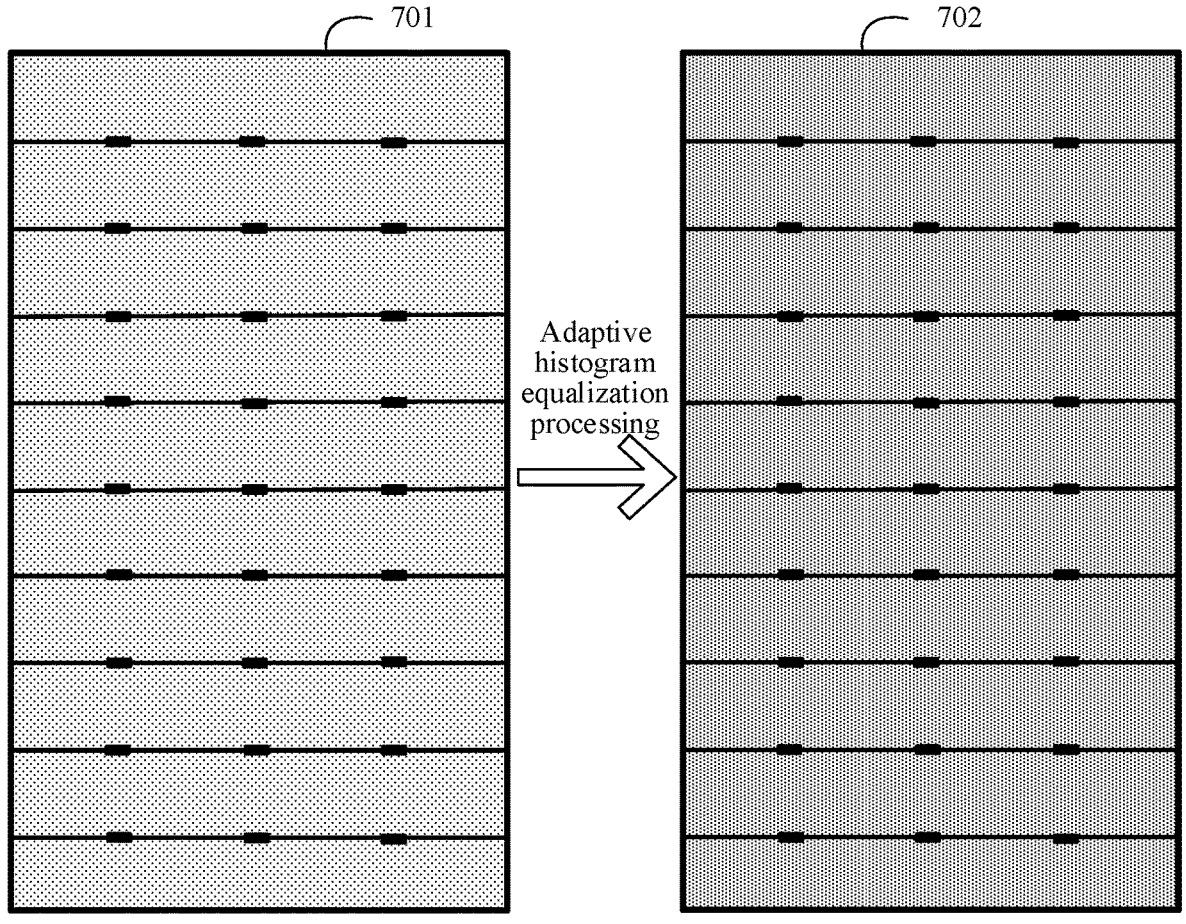
FIG. 11 is a schematic diagram of an enhanced image according to an embodiment of the disclosure.

After histogram equalization is performed on each image block, an intermediate image is obtained. To eliminate artifacts at image block boundaries, bilinear interpolation is performed on the intermediate image to obtain the enhanced image. FIG. 11 is a schematic diagram of an enhanced image according to an embodiment of the disclosure. In FIG. 11, 701 denotes an image, and 702 denotes an enhanced image. As can be seen from FIG. 11, a local gray level difference in the enhanced image 702 undergone adaptive histogram equalization is more obvious. In FIG. 11, dot filling is used for representing changes in gray levels, and a darker color of the image 702 than the image 701 indicates a more pronounced difference in gray levels.

Operation S604: Calculate a grayscale histogram corresponding to each of the N image regions.

After dividing the image into the N image regions by operation S603, the image processing device may calculate a grayscale histogram of each image region, so as to calculate image difference information between every two adjacent image regions based on the grayscale histogram of each image region.

Figure 12:
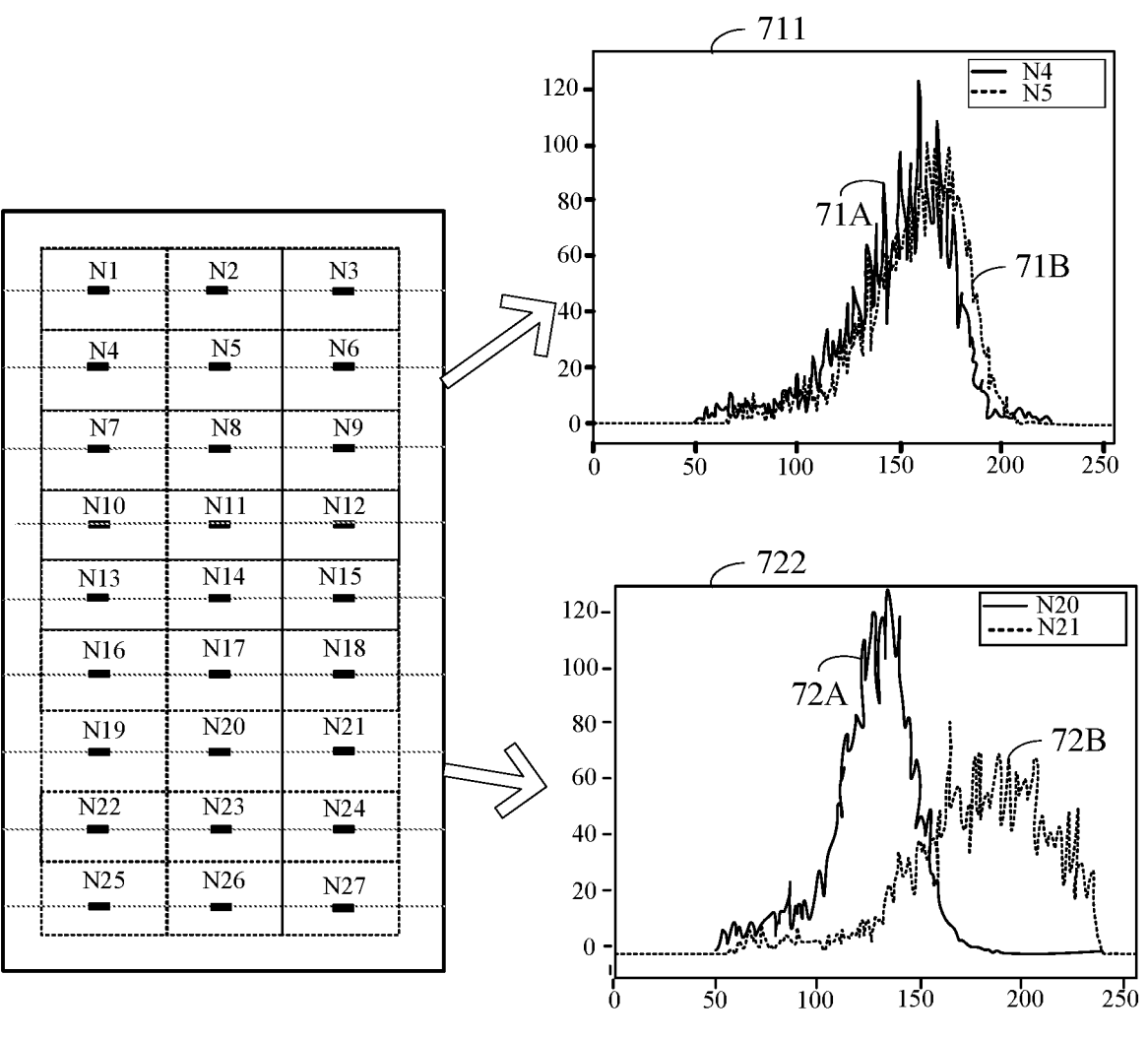
FIG. 12 is a schematic diagram of grayscale histograms of image regions according to an embodiment of the disclosure.

It is to be understood that the minimum gray value of any pixel point is 0, and the maximum gray value is 255, that is, a gray value of any pixel point is 0-255. Calculating a grayscale histogram corresponding to an image region may include: using 0-255 as an abscissa to count the number of occurrences of each gray value in the image region, and using the number of occurrences of each gray value in the image region as an ordinate. For example, FIG. 12 is a schematic diagram of a grayscale histogram of an image region according to an embodiment of the disclosure. In FIG. 12, grayscale histograms of an image region N4 and an image region N5 are represented as 711. In 711, 71A represents the grayscale histogram of the image region N4, and 71B represents the grayscale histogram of the image region N5. In FIG. 12, grayscale histograms of an image region N20 and an image region N21 are represented as 722. In 722, 72A represents the grayscale histogram of the image region N20, and 72B represents the grayscale histogram of the image region N21.

Operation S605: Obtain a histogram distance calculation rule, and determine, according to the histogram distance calculation rule, a distance between grayscale histograms corresponding to every two adjacent image regions.

To calculate a distance between grayscale histograms corresponding to every two adjacent image regions, a histogram distance calculation rule as shown in formula (3) may be selected in an embodiment of the disclosure:

$$d(H_1, H_2) = \sqrt{1 - \frac{1}{\sqrt{\overline{H_1}\overline{H_2}N^2}} \sum_I \sqrt{H_1(I) \cdot H_2(I)}} \; ; \tag{3}$$

In formula (3), $H_1$ is a grayscale histogram corresponding to one of two adjacent image regions, $H_2$ is a grayscale histogram corresponding to the other of the two adjacent image regions, N is the quantity of grids in the whole grayscale histogram, $\overline{H_k}$ represents a mean gray value of an image region, $H_k(I)$ indicates each gray value of a grayscale histogram, and the value of I is 0-255, where $\overline{H_k}$ may be calculated by formula (4). In formula (4), the value of i is 0-255.

$$\overline{H_k} = \frac{\sum_i H_k(i)}{N}, k = 1, 2; \tag{4}$$

Figure 13:
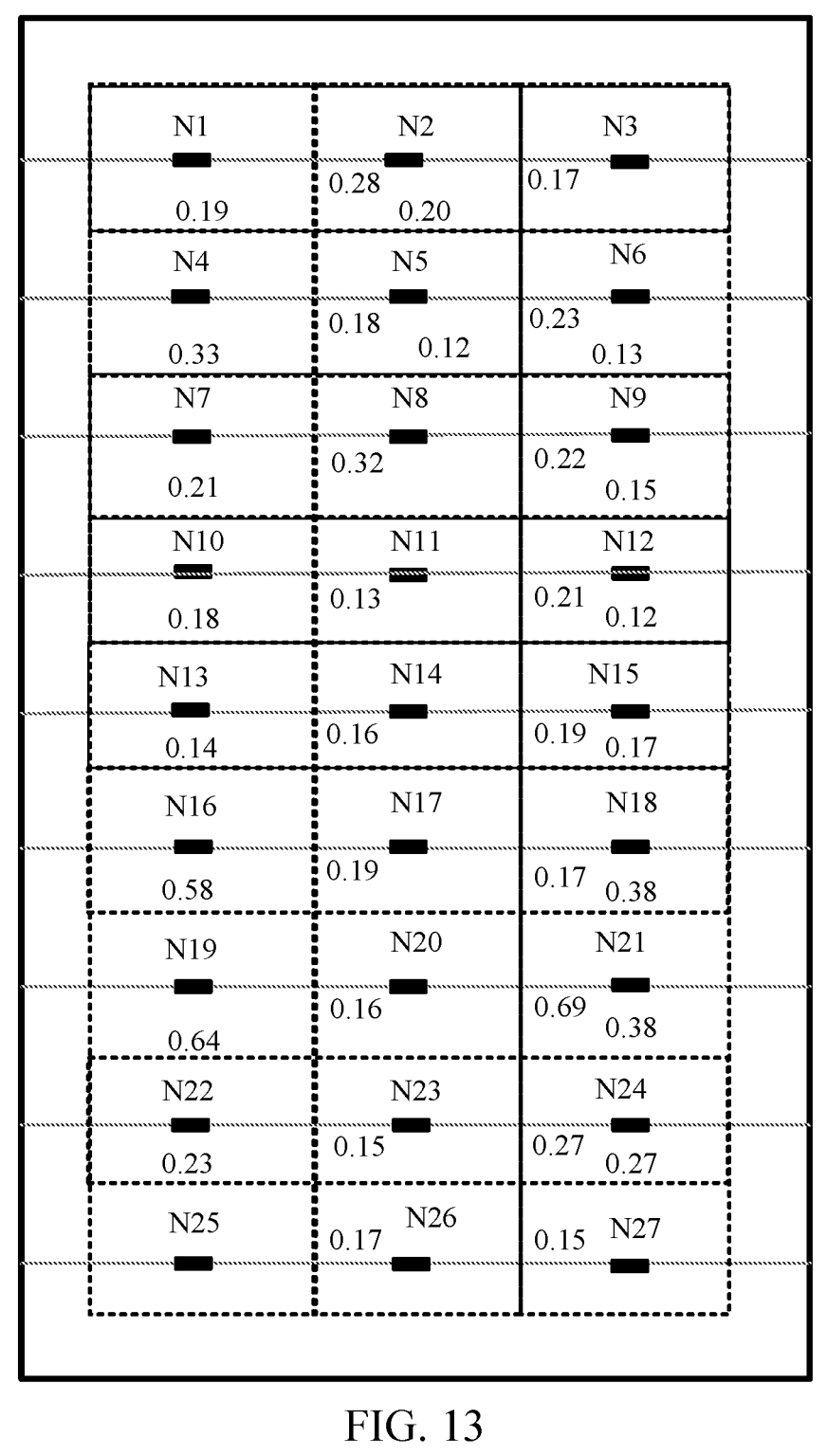

According to foregoing histogram distance calculation rule, a distance between a grayscale histogram corresponding to each image region and a grayscale histogram corresponding to adjacent image regions can be calculated. For example, a distance between grayscale histograms corresponding to each image region and adjacent image regions may be as shown in FIG. 13. In FIG. 13, a distance between a grayscale histogram corresponding to an image region and a grayscale histogram corresponding to an adjacent image region at the right side of the image region is distributed near an intersection line of the image region and the adjacent image region at the right side of the image region. For example, an adjacent image region at the right side of the image region N5 is N6, and a distance between a grayscale histogram corresponding to N5 and a grayscale histogram corresponding to N6 is 0.23, and is distributed near an intersection line of N5 and N6. Similarly, a distance between a grayscale histogram corresponding to an image region and a grayscale histogram corresponding to an adjacent image region at the left side of the image region is distributed near an intersection line of the image region and the adjacent image region at the left side. For example, an adjacent image region at the left side of an image region N14 is N13, and a distance between a grayscale histogram corresponding to N14 and a grayscale histogram corresponding to N13 is 0.16, and is distributed near an intersection line of N14 and N13. A distance between a grayscale histogram corresponding to an image region and a grayscale histogram corresponding to an adjacent image region at the upper side of the image region is distributed near an intersection line of the image region and the adjacent image region at the upper side of the image region. For example, an adjacent image region at the upper side of an image region N24 is N21, and a distance between a grayscale histogram corresponding to N24 and a grayscale histogram corresponding to N21 is 0.38, and is distributed near an intersection line of N24 and N21. A distance between a grayscale histogram corresponding to an image region and a grayscale histogram corresponding to an adjacent image region at the lower side of the image region is distributed near an intersection line of the image region and the adjacent image region at the lower side of the image region. For example, an adjacent image region at the lower side of an image region N19 is N22, and a distance between a grayscale histogram corresponding to N19 and a grayscale histogram corresponding to N22 is 0.64, and is distributed near an intersection line of N19 and N22.

Operation S606: Store the distance between the grayscale histograms corresponding to every two adjacent image regions into an image difference information set as image difference information between every two adjacent image regions.

A relatively large distance between the grayscale histograms corresponding to two adjacent image regions may indicate that the gray level difference between the two adjacent image regions is relatively large. For example, in FIG. 12, it can be seen that a distance between the grayscale histograms corresponding to the image region N4 and the image e region N5 is relatively small, and the distance between the grayscale histograms corresponding to the image region N4 and the image region N5 is calculated to be 0.18 by formula (3); a distance between the grayscale histograms corresponding to the image region N20 and the image region N21 is relatively large, and the distance between the two grayscale histograms is calculated to be 0.69 by formula (3).

Operation S607: Perform fault recognition on the target battery module based on the image difference information set.

In one embodiment, performing fault recognition on the target battery module based on the image difference information set may be determining whether the target battery module has a preset fault based on the image difference information, where the preset fault may be a pseudo soldering fault. As an example, the image processing device performing fault recognition on the target battery module based on the image difference information set includes: in response to a target quantity of target image difference information existing in the image difference information set, determining that the target battery module has a preset fault, where the target image difference information is image difference information satisfying a fault existence condition.

As an optional implementation, the image difference information between two adjacent image regions may be the distance between the grayscale histograms corresponding to the two adjacent image regions, and accordingly, the fault existence condition includes that the foregoing distance is greater than or equal to a distance threshold.

As another optional implementation, the image difference information between two adjacent image regions may be a difference between mean gray values corresponding to the two adjacent image regions, and accordingly, the fault existence condition includes that the difference of the mean gray values is greater than or equal to a mean gray value threshold.

In another embodiment, performing fault recognition on the target battery module based on the image difference information set may also be: in response to determining that the target battery module has a preset fault, recognizing a solder joint having the preset fault in the target battery module. As an example, in response to determining that the target battery module has a preset fault based on the image difference information set, the image processing device determines a target image region set from the N image regions based on the image difference information set, and determines a solder joint corresponding to each target image region in the target image region set as a solder joint having the preset fault.

As an optional implementation, the determining of a target image region set from the N image regions based on the image difference information set includes: obtaining two candidate image regions related to each piece of target image difference information, where the two candidate image regions related to each piece of target image difference information are two adjacent image regions in the image; and determining one target image region from the two candidate image regions based on mean gray values corresponding to the two candidate image regions, and storing the target image region in the target image region set. As an example, the image processing device may use the candidate adjacent image region in two candidate adjacent image regions having a smaller mean gray value as the target image region.

As another optional implementation, determining a target image region set from the N image regions based on the image difference information set includes: obtaining two candidate image regions related to each piece of target image difference information, where the two candidate image regions are two adjacent image regions used for calculating the target image difference information; and determining E pieces of image difference information corresponding to each candidate image region, where the E pieces of image difference information includes image difference information between the candidate image region and each adjacent image region; and in response to a ratio between a statistical quantity and E being greater than a preset ratio, adding the candidate image region as a target image region to the target image region set, where the statistical quantity is the quantity of image difference information satisfying the fault existence condition among the E pieces of image difference information, that is, statistics is collected about the quantity of image difference information satisfying the fault existence condition among the E pieces of image difference information to obtain the statistical quantity, where E is a positive integer greater than one. As an example, the preset ratio may be $\frac{1}{3}$, $\frac{1}{2}$, $\frac{3}{4}$, etc.

For example, when the preset ratio is $\frac{1}{2}$, and one candidate image region has three adjacent image regions, then the candidate image region corresponds to three pieces of image difference information. If two of the three pieces of image difference information satisfy the fault existence condition, a ratio between the quantity of image difference information satisfying the fault existence condition in the candidate image region and E is $\frac{2}{3}$. $\frac{2}{3}$ is greater than $\frac{1}{2}$; therefore, it may be considered that the candidate image region may be stored in the target image region set as a target image region.

As another optional implementation, the determining a target image region set from the N image regions based on the image difference information set includes: obtaining two candidate image regions related to each piece of target image difference information, where the two candidate image regions are two adjacent image regions in the image; and determining the candidate image region having a mean gray value less than a mean gray value threshold in the two candidate image regions as a target image region, and storing the target image region in the target image region set.

To sum up, candidate image regions that may have a preset fault are selected from N image regions according to the image difference information between every two adjacent image regions, then mean gray values of these candidate image regions are calculated, and the candidate image region having a mean gray value less than a mean gray value threshold is determined as a target image region having a preset fault. The mean gray value threshold may be predetermined according to gray levels of images corresponding to different target battery modules.

Figure 14:
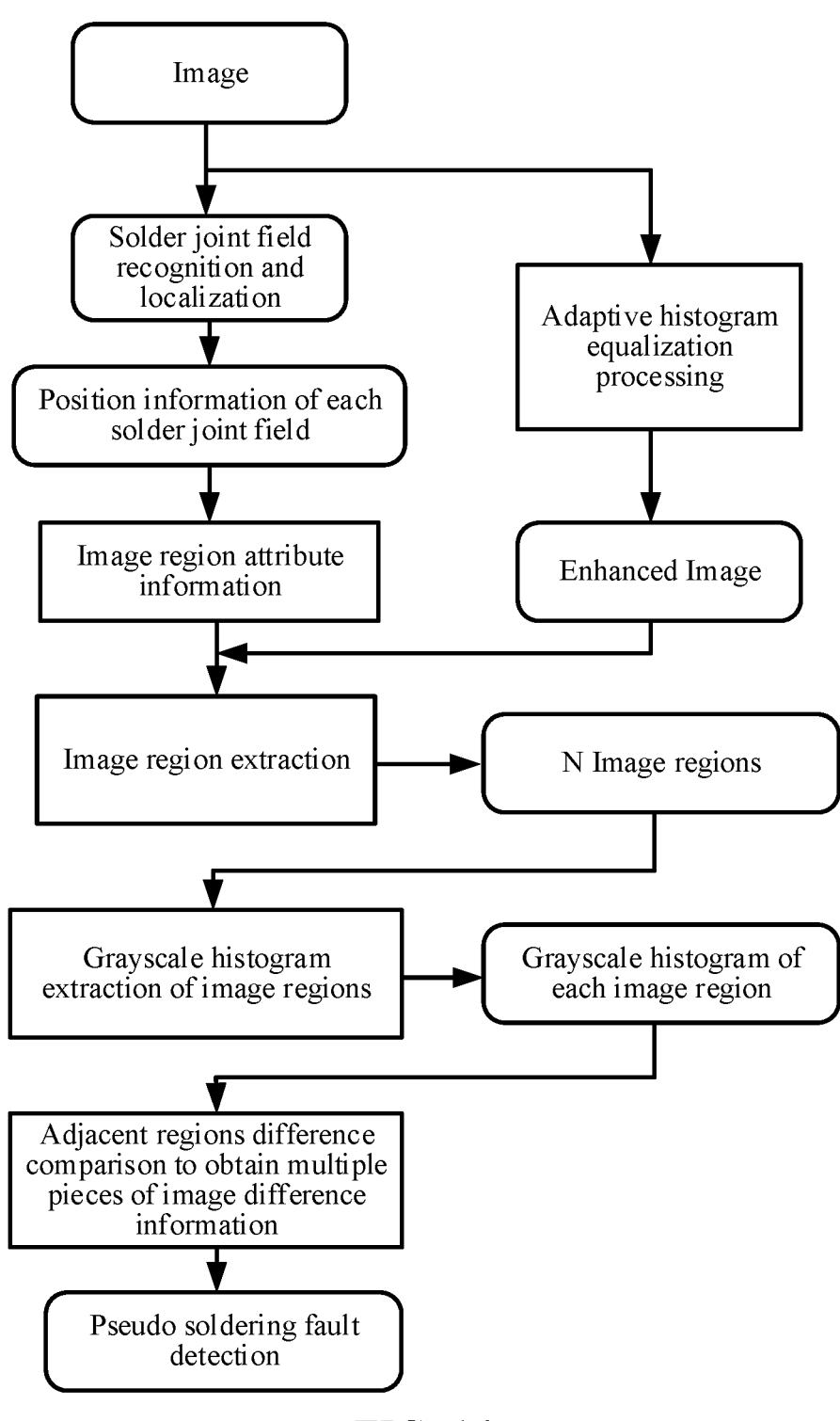
FIG. 14 is a schematic flowchart of still another image processing method according to an embodiment of the disclosure.

Based on the foregoing description, implementation operations of the image processing method shown in FIG. 10 may be as shown in FIG. 14. In response to obtaining a to-be-detected image, an image processing device performs solder joint field recognition and localization on the to-be-detected image to obtain position information of at least two solder joint fields; performs adaptive histogram equalization on the image to obtain an enhanced image; obtains image region attribute information and performs image region extraction on the enhanced image according to the position information of the at least two solder joint fields and the image region attribute information to obtain N image regions; further, extracts a grayscale histogram of each image region and performs adjacent region difference comparison on the grayscale histograms corresponding to every two adjacent image regions, that is, calculate a distance between the grayscale histograms corresponding to adjacent image regions, to obtain multiple pieces of image difference information (i.e., at least two pieces of image difference information); and performs fault detection on the target battery module based on the at least two pieces of image difference information.

In conclusion, in the image processing method provided by the embodiment, to perform fault recognition on a target battery module, an image corresponding to the target battery module is to be obtained. The target battery module includes N solder joints. The image includes N solder joint fields in one-to-one correspondence with the N solder joints. Further, position information of the N solder joint fields included in the image is recognized, image region attribute information is obtained, and the image is divided into N image regions based on the position information of the N solder joint fields and the image region attribute information. Then, a grayscale histogram of each image region is calculated, and a distance between grayscale histograms corresponding to every two adjacent image regions is calculated to obtain an image difference information set. Finally, preset fault recognition is performed on the target battery module based on the image difference information set. Because there may be abnormal image difference information between two or more image regions in the image corresponding to a battery module having a preset fault, conversely, it is possible to accurately recognize whether the target battery module has a fault through the image difference information set.

Figure 15:
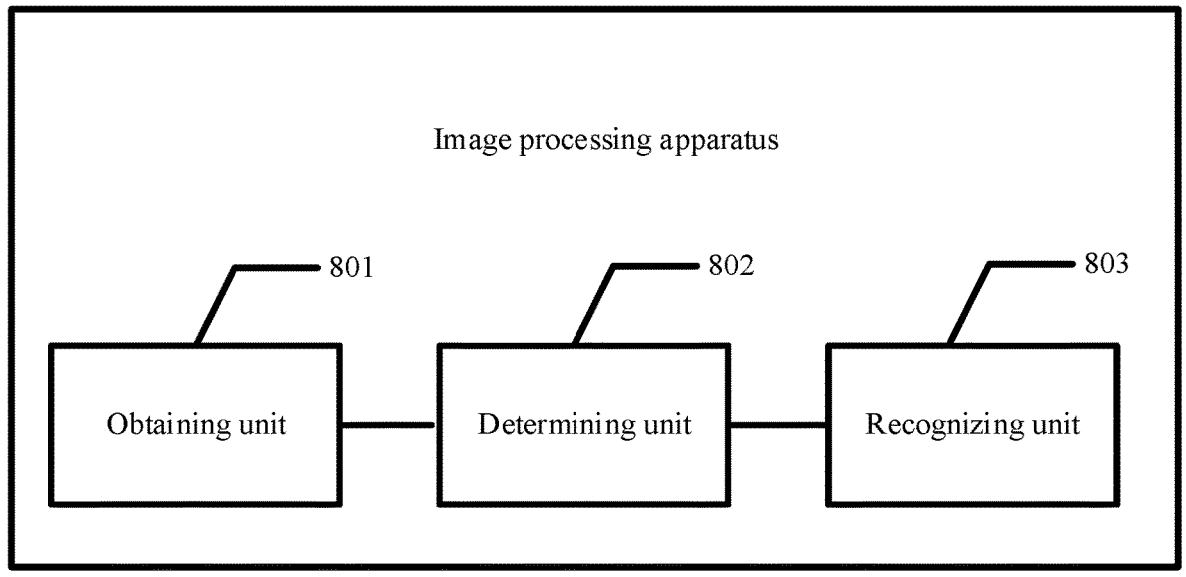
FIG. 15 is a schematic structural diagram of an image processing apparatus according to an embodiment of the disclosure.

FIG. 15 is a schematic structural diagram of an image processing apparatus according to an embodiment of the disclosure. The image processing apparatus shown in FIG. 15 may run the following units:

an obtaining unit 801, configured to obtain an image corresponding to a target battery module, the target battery module including N solder joints, the N solder joints being mapped to N solder joint fields in the image, and N being an integer greater than or equal to 1;

a determining unit 802, configured to divide the image according to the N solder joint fields to obtain N image regions in one-to-one correspondence with the N solder joint fields, the determining unit 802 being further configured to calculate image difference information between every two adjacent image regions among the N image regions to obtain an image difference information set; and a recognizing unit 803, configured to perform fault recognition on the target battery module based on the image difference information set.

In an embodiment, during dividing the image according to the N solder joint fields to obtain N image regions in one-to-one correspondence with the N solder joint fields, the determining unit 802 performs the following operations:

performing solder joint field recognition on the image to obtain position information of the N solder joint fields;

obtaining image region attribute information, where the image region attribute information is used for indicating the shape and size of an image region; and dividing the image according to the position information of the N solder joint fields and the image region attribute information to obtain the N image regions.

In an embodiment, during performing solder joint field recognition on the image to obtain position information of the N solder joint fields, the determining unit 802 performs the following operations:

performing grayscale accumulation on the image in a vertical direction based on an integral projection algorithm to obtain a horizontal integral projection, and performing grayscale accumulation on the image in a horizontal direction based on the integral projection algorithm to obtain a vertical integral projection, where a width of the horizontal integral projection represents a width of the image, a height of the horizontal integral projection represents a result of grayscale accumulation in respect of at least two length values corresponding to each width value, a width of the vertical integral projection represents a height of the image, and a height of the vertical integral projection represents a result of grayscale accumulation in respect of at least two width values corresponding to each height value;

obtaining M width values corresponding to M peaks in the horizontal integral projection, and obtaining P height values corresponding to P peaks in the vertical integral projection;

performing permutation and combination on the M width values and the P height values to obtain N central positions corresponding to the N solder joint fields, where M and P are both positive integers, and a product of M and P is N; and determining position information of the N solder joint fields based on the N central positions and solder joint field attribute information, where the solder joint field attribute information is used for indicating the shape and size of a solder joint field.

In an embodiment, during dividing the image according to the position information of the N solder joint fields and the image region attribute information to obtain N image regions, the determining unit 802 performs the following operations:

preprocessing the image to obtain an enhanced image; and dividing the enhanced image according to the position information of the N solder joint fields and the image region attribute information to obtain the N image regions.

In an embodiment, during preprocessing the image to obtain an enhanced image, the determining unit 802 performs the following operations:

dividing the image into at least two image blocks;

performing histogram equalization on the image blocks to obtain an intermediate image; and performing bilinear interpolation on the intermediate image to obtain the enhanced image.

In an embodiment, during performing fault recognition on the target battery module based on the image difference information set, the recognizing unit 803 performs the following operation:

determining, in response to a target quantity of target image difference information existing in the image difference information set, that a preset fault exists in the target battery module, where the target image difference information is image difference information satisfying a fault existence condition.

In an embodiment, during calculating image difference information between every two adjacent image regions among the N image regions to obtain an image difference information set, the recognizing unit 803 performs the following operations:

calculating a grayscale histogram corresponding to each of the N image regions;

obtaining a histogram distance calculation rule, and determining, according to the histogram distance calculation rule, a distance between grayscale histograms corresponding to every two adjacent image regions; and storing the distance in an image difference information set as image difference information between every two adjacent image regions.

In an embodiment, the fault existence condition includes that a distance between grayscale histograms corresponding to every two adjacent image regions is greater than a distance threshold.

In an embodiment, after determining that the target battery module has a preset fault, the recognizing unit 803 performs the following operations:

determining a target image region set from the N image regions based on the image difference information set; and determining a solder joint corresponding to a target image region in the target image region set as a solder joint having a preset fault.

In an embodiment, during determining a target image region set from the N image regions based on the image difference information set, the recognizing unit 803 performs the following operations:

obtaining two candidate image regions related to each piece of target image difference information, where the two candidate image regions are two adjacent image regions used for calculating the target image difference information; and determining a target image region from the two candidate image regions based on two mean gray values corresponding to the two candidate image regions, and storing the target image region in the target image region set.

In an embodiment, during determining a target image region set from the N image regions based on the image difference information set, the recognizing unit 803 performs the following operations:

obtaining two candidate image regions related to each piece of target image difference information, where the two candidate image regions are two adjacent image regions used for calculating the target image difference information;

determining E pieces of image difference information corresponding to each candidate image region, where the E pieces of image difference information include image difference information between each candidate image region and each adjacent image region; and adding the candidate image regions as target image regions to the target image region set in response to a ratio between a statistical quantity and E being greater than a preset ratio, where the statistical quantity is the quantity of image difference information satisfying the fault existence condition among the E pieces of image difference information, and E is a positive integer greater than one.

In an embodiment, during determining a target image region set from the N image regions based on the image difference information set, the recognizing unit 803 performs the following operations:

obtaining two candidate image regions related to each piece of target image difference information, where the two candidate image regions are two adjacent image regions used for calculating the target image difference information; and determining, as a target image region, a candidate image region having a mean gray value less than a mean gray value threshold between the two candidate image regions, and storing the target image region in the target image region set.

According to an embodiment of the disclosure, the operations in the image processing method shown in FIG. 4 and FIG. 10 may be performed by the units in the image processing apparatus shown in FIG. 15. For example, operation S301 in FIG. 4 may be performed by the obtaining unit 801 in the image processing apparatus in FIG. 15, operations S302 and S303 may be performed by the determining unit 802 in the image processing apparatus illustrated in FIG. 15, and operation S304 may be performed by the recognizing unit 803 in the image processing apparatus illustrated in FIG. 15. For another example, operations S601-S603 in the image processing method in FIG. 10 may be performed by the obtaining unit 801 in the image processing apparatus shown in FIG. 15, operations S604 and S605 may be performed by the determining unit 802 in the image processing apparatus shown in FIG. 15, and operation S606 may be performed by the recognizing unit 803 in the image processing apparatus shown in FIG. 15.

According to another embodiment of the disclosure, the units of the image processing apparatus shown in FIG. 15 may be respectively or integrally combined into one or several other units, or one (or more) of the units may further be divided into a plurality of units having more granular functions, to implement same or similar operations without affecting the implementation of technical effects of embodiments of the disclosure. The foregoing units are divided based on logical functions. In an actual application, a function of one single unit may also be implemented by a plurality of units, or functions of a plurality of units are implemented by one single unit. In other embodiments of the disclosure, the image processing apparatus may also include other units. In an actual application, the functions may also be cooperatively implemented by other units and may be cooperatively implemented by a plurality of units.

The units may be implemented by, for example, software modules stored on a memory of a computer, where the instructions of each software module are executable by a processor to thereby cause the processor to perform the respective operations of the corresponding unit. The units may also be implemented by suitable hardware or circuitry, among other suitable implementations.

According to another embodiment of the disclosure, a computer program (including program code) that can perform the operations in the corresponding method shown in FIG. 4 and FIG. 10 may be run on a general computing device, such as a computer, which includes processing elements and storage elements such as a central processing unit, a random access memory storage medium, and a read-only storage medium, to construct the image processing apparatus shown in FIG. 15 and implement the image processing method in embodiments of the disclosure. The computer program may be recorded in, for example, a computer-readable storage medium, and may be loaded into the foregoing computing device by using the computer-readable storage medium, and run in the computing device.

In conclusion, in the image processing apparatus provided by the embodiment, to perform fault recognition on a target battery module, an image corresponding to the target battery module is to be obtained. The image includes images of N solder joints on the target battery module. The image is divided into image regions corresponding to solder joint fields where solder joints are located. Since there may be abnormal image difference information between image regions where at least two solder joint fields are located in an image corresponding to a faulty battery module, a faulty solder joint on the target battery module may be accurately determined by comparing the image difference information between adjacent image regions on a same image. For a batch of target battery modules, preset fault recognition is performed on respective images of the target battery modules, and the fault recognition on the respective target battery modules does not interfere with each other, such that even if a gray level difference between images of different target battery modules is large, accurate fault recognition on each target battery module can be realized.

Figure 16:
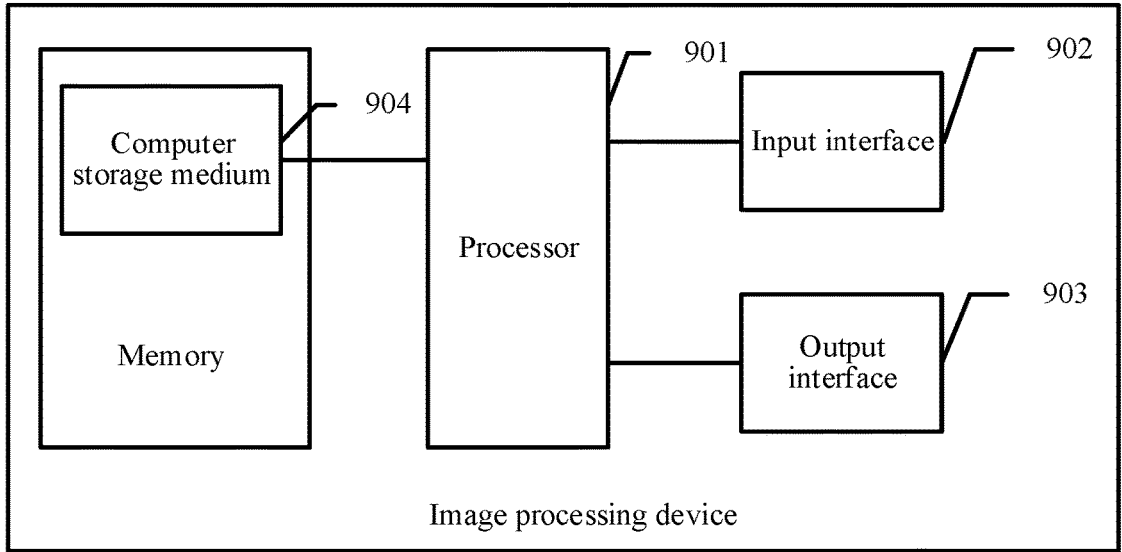
FIG. 16 is a schematic structural diagram of an image processing device according to an embodiment of the disclosure.

Based on embodiments of the image processing method and apparatus described above, an embodiment of the disclosure further provides an image processing device. FIG. 16 is a schematic structural diagram of an image processing device according to an embodiment of the disclosure. The image processing device shown in FIG. 16 may at least include a processor 901, an input interface 902, an output interface 903, and a computer storage medium 904. The processor 901, the input interface 902, the output interface 903, and the computer storage medium 904 may be connected by a bus or in another manner.

The computer storage medium 904 may be stored in a memory of the image processing device. The computer storage medium 904 is configured to store a computer program. The processor 901 is configured to execute the computer program stored in the computer storage medium 904. The processor 901 (or referred to as a central processing unit (CPU)) is a computing core and a control core of the image processing device, is suitable for implementing one or more computer program, and is specifically suitable for loading and executing one or more computer program to implement a corresponding method procedure or a corresponding function.

In an embodiment, the processor 901 may be configured to perform the image processing method provided in various embodiments of the disclosure.

An embodiment of the disclosure further provides a computer storage medium (memory), and where the computer storage medium is a memory device in an image processing device and is configured to store a program and data. It may be understood that the computer storage medium herein may include an internal storage medium of the image processing device and may also include an extended storage medium supported by the image processing device. The computer storage medium provides storage space, and the storage space stores an operating system of the image processing device. In addition, the storage space further stores one or more computer programs loadable and executable by the processor 901. The computer storage medium herein may be a high-speed RAM or a non-volatile memory, for example, at least one magnetic disk memory. Optionally, the computer storage medium may further be at least one computer storage medium located away from the foregoing processor.

In an embodiment, the processor 901 may load and execute one or more computer programs stored in the computer storage medium, to implement corresponding operations of the embodiments of the image processing method shown in FIG. 4 and FIG. 10.

An embodiment of the disclosure provides a computer program product or a computer program, where the computer program product or the computer program is stored in a computer storage medium. A processor of an image processing device reads the computer program from the computer storage medium, and executes the computer program, to cause the image processing device to perform the embodiments of the image processing method shown in FIG. 4 and FIG. 10. The computer storage medium may be a magnetic disk, an optical disc, a read-only memory (ROM), a random access memory (RAM), etc.

The foregoing descriptions are merely specific implementations, but are not intended to limit the protection scope of the disclosure. Any variation or replacement readily figured out by a person skilled in the art within the technical scope disclosed herein shall fall within the protection scope of the disclosure. Therefore, the protection scope of the disclosure shall be subject to the protection scope of the claims.

What is claimed is:

1. An image processing method, performed by an image processing device, the method comprising:
obtaining an image corresponding to a target battery module, the target battery module comprising a plurality of solder joints, the plurality of solder joints being respectively mapped to a plurality of solder joint fields in the image, wherein a number of the plurality of solder joints is equal to a number of the plurality of solder joint fields;
dividing the image according to the plurality of solder joint fields to obtain a plurality of image regions in one-to-one correspondence with the plurality of solder joint fields, wherein the number of the plurality of solder joint fields is equal to a number of the plurality of image regions;
calculating image difference information between each pair of adjacent image regions among the plurality of image regions to obtain an image difference information set; and
performing fault recognition on the target battery module based on the image difference information set.

2. The image processing method according to claim 1, wherein the dividing of the image comprises:

performing solder joint field recognition on the image to obtain position information of each of the plurality of solder joint fields;

obtaining image region attribute information for indicating a shape and size of an image region; and dividing the image according to the position information of the plurality of solder joint fields and the image region attribute information to obtain the plurality of image regions.

3. The image processing method according to claim 2, wherein the performing of the solder joint field recognition comprises:

performing grayscale accumulation on the image in a vertical direction based on an integral projection algorithm to obtain a horizontal integral projection, and performing the grayscale accumulation on the image in a horizontal direction based on the integral projection algorithm to obtain a vertical integral projection, wherein a width of the horizontal integral projection represents a width of the image, a height of the horizontal integral projection represents a result of grayscale accumulation based on at least two length values corresponding to each width value, a width of the vertical integral projection represents a height of the image, and a height of the vertical integral projection represents a result of the grayscale accumulation based on at least two width values corresponding to each height value;

obtaining a plurality of width values corresponding to a plurality of peaks in the horizontal integral projection, and obtaining a plurality of height values corresponding to a plurality of peaks in the vertical integral projection;

performing permutation and combination on the plurality of width values and the plurality of height values to obtain a plurality of central positions corresponding to the plurality of solder joint fields, wherein a number of the plurality of central positions is equal to a number of the plurality of solder joint fields, and wherein the number of the plurality of central positions is equal to a product of a number of the plurality of width values and a number of the plurality of height values; and determining the position information of the plurality of solder joint fields based on the plurality of central positions and solder joint field attribute information, wherein the solder joint field attribute information is used for indicating the shape and size of a solder joint field.

4. The image processing method according to claim 2, wherein the dividing of the image comprises:

preprocessing the image to obtain an enhanced image; and dividing the enhanced image according to the position information of the plurality of solder joint fields and the image region attribute information to obtain the plurality of image regions.

5. The image processing method according to claim 4, wherein the preprocessing of the image comprises:

dividing the image into at least two image blocks;

performing histogram equalization on the at least two image blocks to obtain an intermediate image; and performing bilinear interpolation on the intermediate image to obtain the enhanced image.

6. The method according to claim 1, wherein the performing of the fault recognition comprises:

determining, based on a target quantity of target image difference information existing in the image difference information set, that a preset fault exists in the target battery module, wherein the target image difference information is image difference information satisfying a fault existence condition.

7. The image processing method according to claim 6, wherein the calculating of the image difference information comprises:

calculating a grayscale histogram corresponding to each of the plurality of image regions;

obtaining a histogram distance calculation rule, and determining, according to the histogram distance calculation rule, a distance between grayscale histograms corresponding to every two adjacent image regions; and storing, in the image difference information set, the distance as the image difference information.

8. The image processing method according to claim 7, wherein the fault existence condition comprises the distance being greater than a preset distance threshold.

9. The image processing method according to claim 6, further comprising, after the determining that the preset fault exists:

determining a target image region set from the plurality of image regions based on the image difference information set; and determining a solder joint corresponding to a target image region in the target image region set as a solder joint having the preset fault.

10. The image processing method according to claim 9, wherein the determining of the target image region set comprises:

for each piece of target difference information, obtaining a pair of candidate image regions related to the piece of target image difference information, wherein the pair of candidate image regions comprises two adjacent image regions used for calculating the target image difference information; and for each pair of candidate image regions, determining a target image region from the pair of candidate image regions based on mean gray values respectively corresponding to the image regions of the pair of candidate image regions, and storing the target image region in the target image region set.

11. The image processing method according to claim 9, wherein the determining of the target image region set comprises:

for each piece of target difference information, obtaining a pair of candidate image regions related to the piece of target image difference information, wherein the pair of candidate image regions comprises two adjacent image regions used for calculating the target image difference information;

for each candidate image region, determining a plurality of pieces of image difference information comprising image difference information between the candidate image region and image regions adjacent to the candidate image region; and for each candidate image region, adding the candidate image region as a target image region to the target image region set based on a ratio between a statistical quantity and a number of corresponding plurality of pieces of image difference information being greater than a preset ratio, wherein the statistical quantity is a quantity of the plurality of pieces of image difference information which satisfy the fault existence condition.

12. The image processing method according to claim 9, wherein the determining of the target image region set comprises:

for each piece of target difference information, obtaining a pair of candidate image regions related to the piece of target image difference information, wherein the pair of candidate image regions comprises two adjacent image regions used for calculating the target image difference information; and for each pair of candidate image regions, determining, as a target image region, a candidate image region having a mean gray value less than a mean gray value threshold between the image regions of the pair of candidate image regions, and storing the target image region in the target image region set.

13. An image processing apparatus, comprising:

at least one computer storage medium storing at least one computer program; and at least one processor configured to execute the at least one computer program, the at least one computer program thereby causing the at least one processor to perform operations of:

obtaining an image corresponding to a target battery module, the target battery module comprising a plurality of solder joints, the plurality of solder joints being respectively mapped to a plurality of solder joint fields in the image, wherein a number of the plurality of solder joints is equal to a number of the plurality of solder joint fields;

dividing the image according to the plurality of solder joint fields to obtain a plurality of image regions in one-to-one correspondence with the plurality of solder joint fields, wherein the number of the plurality of solder joint fields is equal to a number of the plurality of image regions, and calculating image difference information between each pair of adjacent image regions among the plurality of image regions to obtain an image difference information set; and performing fault recognition on the target battery module based on the image difference information set.

14. The image processing apparatus according to claim 13, wherein the at least one processor is caused to divide the image by:

performing solder joint field recognition on the image to obtain position information of each of the plurality of solder joint fields;

obtaining image region attribute information for indicating a shape and size of an image region; and dividing the image according to the position information of the plurality of solder joint fields and the image region attribute information to obtain the plurality of image regions.

15. The image processing apparatus according to claim 14, wherein the at least one processor is caused to perform solder joint field recognition by:

performing grayscale accumulation on the image in a vertical direction based on an integral projection algorithm to obtain a horizontal integral projection, and performing the grayscale accumulation on the image in a horizontal direction based on the integral projection algorithm to obtain a vertical integral projection, wherein a width of the horizontal integral projection represents a width of the image, a height of the horizontal integral projection represents a result of grayscale accumulation based on at least two length values corresponding to each width value, a width of the vertical integral projection represents a height of the image, and a height of the vertical integral projection represents a result of the grayscale accumulation based on at least two width values corresponding to each height value;

obtaining a plurality of width values corresponding to a plurality of peaks in the horizontal integral projection, and obtaining a plurality of height values corresponding to a plurality of peaks in the vertical integral projection;

performing permutation and combination on the plurality of width values and the plurality of height values to obtain a plurality of central positions corresponding to the plurality of solder joint fields, wherein a number of the plurality of central positions is equal to a number of the plurality of solder joint fields, and wherein the number of the plurality of central positions is equal to a product of a number of the plurality of width values and a number of the plurality of height values; and determining the position information of the plurality of solder joint fields based on the plurality of central positions and solder joint field attribute information, wherein the solder joint field attribute information is used for indicating the shape and size of a solder joint field.

16. The image processing apparatus according to claim 13, wherein the at least one processor is caused to perform the fault recognition by determining, based on a target quantity of target image difference information existing in the image difference information set, that a preset fault exists in the target battery module, wherein the target image difference information is image difference information satisfying a fault existence condition, and wherein the at least one computer program further causes the at least one processor to perform operations of:

determining a target image region set from the plurality of image regions based on the image difference information set, and determining a solder joint corresponding to a target image region in the target image region set as a solder joint having the preset fault.

17. The image processing apparatus according to claim 16, wherein the at least one processor is caused to determine the target image region set by:

for each piece of target difference information, obtaining a pair of candidate image regions related to the piece of target image difference information, wherein the pair of candidate image regions comprises two adjacent image regions used for calculating the target image difference information; and for each pair of candidate image regions, determining a target image region from the pair of candidate image regions based on mean gray values respectively corresponding to the image regions of the pair of candidate image regions, and storing the target image region in the target image region set.

18. The image processing apparatus according to claim 16, wherein the at least one processor is caused to determine the target image region set by:

for each piece of target difference information, obtaining a pair of candidate image regions related to the piece of target image difference information, wherein the pair of candidate image regions comprises two adjacent image regions used for calculating the target image difference information;

for each candidate image region, determining a plurality of pieces of image difference information comprising image difference information between the candidate image region and image regions adjacent to the candidate image region; and for each candidate image region, adding the candidate image region as a target image region to the target image region set based on a ratio between a statistical quantity and a number of corresponding plurality of pieces of image difference information being greater than a preset ratio, wherein the statistical quantity is a quantity of the plurality of pieces of image difference information which satisfy the fault existence condition.

19. The image processing apparatus according to claim 16, wherein the at least one processor is caused to determine the target image region set by:

for each piece of target difference information, obtaining a pair of candidate image regions related to the piece of target image difference information, wherein the pair of candidate image regions comprises two adjacent image regions used for calculating the target image difference information; and for each pair of candidate image regions, determining, as a target image region, a candidate image region having a mean gray value less than a mean gray value threshold between the image regions of the pair of candidate image regions, and storing the target image region in the target image region set.

20. A non-transitory computer storage medium, storing a computer program, the computer program, when executed by a processor, being configured to perform an image processing method comprising:

obtaining an image corresponding to a target battery module, the target battery module comprising a plurality of solder joints, the plurality of solder joints being respectively mapped to a plurality of solder joint fields in the image, wherein a number of the plurality of solder joints is equal to a number of the plurality of solder joint fields;

dividing the image according to the plurality of solder joint fields to obtain a plurality of image regions in one-to-one correspondence with the plurality of solder joint fields, wherein the number of the plurality of solder joint fields is equal to a number of the plurality of image regions;

calculating image difference information between each pair of adjacent image regions among the plurality of image regions to obtain an image difference information set; and performing fault recognition on the target battery module based on the image difference information set.

\* \* \* \* \*